(12) United States Patent
Yamaguchi et al.

(10) Patent No.: US 12,557,197 B2
(45) Date of Patent: Feb. 17, 2026

(54) CONTROL DEVICE OF ILLUMINATION SYSTEM

(71) Applicant: Japan Display Inc., Tokyo (JP)

(72) Inventors: Kazunori Yamaguchi, Tokyo (JP); Chiehan Chien, Tokyo (JP); Gang Shao, Tokyo (JP)

(73) Assignee: Japan Display Inc., Tokyo (JP)

( * ) Notice: Subject to any disclaimer, the term of this patent is extended or adjusted under 35 U.S.C. 154(b) by 68 days.

(21) Appl. No.: 18/771,730

(22) Filed: Jul. 12, 2024

(65) Prior Publication Data

US 2024/0373533 A1    Nov. 7, 2024

Related U.S. Application Data

(63) Continuation of application No. PCT/JP2022/047457, filed on Dec. 22, 2022.

(30) Foreign Application Priority Data

Jan. 25, 2022    (JP) ................................ 2022-009703

(51) Int. Cl.
*H05B 47/10*     (2020.01)
*F21V 9/40*      (2018.01)
(Continued)

(52) U.S. Cl.
CPC ............. *H05B 47/105* (2020.01); *F21V 9/40* (2018.02); *F21V 33/0052* (2013.01);
(Continued)

(58) Field of Classification Search
CPC ...... H05B 47/10; H05B 47/105; H05B 47/19; H05B 47/1965; F21V 9/40; F21V 33/0052; G02F 1/1347
See application file for complete search history.

(56) References Cited

U.S. PATENT DOCUMENTS

2018/0164615 A1*  6/2018  Yoon .................. G02F 1/133524
2020/0264464 A1*  8/2020  Matsuda ............... G02F 1/1396

FOREIGN PATENT DOCUMENTS

| JP | H02-065001 A | 3/1990 |
| JP | 2014-022112 A | 2/2014 |
| WO | WO2018/055722 A1 | 3/2018 |

OTHER PUBLICATIONS

Search Report issued in related International Patent Application No. PCT/JP2022/047457 mailed on Jan. 31, 2023 and English translation of same. 5 pages.

(Continued)

*Primary Examiner* — Jimmy T Vu
(74) *Attorney, Agent, or Firm* — K&L Gates LLP

(57) ABSTRACT

A control device of an illumination system includes an illumination device capable of controlling a distribution angle of light emitted from a light source. The control device includes a detection device including a distribution angle adjustment region for the illumination device on an XY plane with a predetermined position as the origin in a detection region provided with a plurality of detection elements arranged in an X direction and a Y direction, a display panel including a display region overlapping the detection region in plan view, the display panel being provided with a distribution angle adjustment object in a region overlapping the distribution angle adjustment region in the display region, and a processing device.

10 Claims, 25 Drawing Sheets

(51) Int. Cl.
    *F21V 33/00*     (2006.01)
    *G02F 1/13*     (2006.01)
    *G02F 1/1347*     (2006.01)
    *H05B 47/105*     (2020.01)
    *H05B 47/175*     (2020.01)
    *H05B 47/19*     (2020.01)

(52) U.S. Cl.
    CPC ........... *G02F 1/1347* (2013.01); *H05B 47/19* (2020.01); *H05B 47/1965* (2024.01)

(56) References Cited

OTHER PUBLICATIONS

Written Opinion issued in related International Patent Application No. PCT/JP2022/047457 mailed on Jan. 31, 2023. 3 pages.

\* cited by examiner

CONTROL DEVICE OF ILLUMINATION SYSTEM

CROSS-REFERENCE TO RELATED APPLICATION

This application is a continuation of International Patent Application No. PCT/JP2022/047457 filed on Dec. 22, 2022 which designates the United States, incorporated herein by reference, and which claims the benefit of priority from Japanese Patent Application No. 2022-009703 filed on Jan. 25, 2022, incorporated herein by reference.

BACKGROUND

1. Technical Field

The present disclosure relates to a control device of an illumination system.

2. Description of the Related Art

In a conventional illumination instrument, a light source such as an LED is combined with a thin lens provided with a prism pattern, and the distance between the light source and the thin lens is changed to change a light distribution angle. For example, an illumination instrument is disclosed (refer to Japanese Patent Application Laid-open Publication No. H02-065001, for example) in which the front of a transparent light bulb is covered by a liquid crystal light adjustment element, and the transmittance of a liquid crystal layer is changed to switch directly reaching light and scattering light.

For example, in an illumination device including a liquid crystal cell for p wave polarization and a liquid crystal cell for s wave polarization, the distribution angle of light in two directions can be controlled by driving the respective liquid crystal cells. In such an illumination device capable of controlling the distribution angle of light in two directions, it is desirable to be able to simultaneously adjust the distribution angle of light in the two directions.

The present disclosure is intended to provide a control device of an illumination system capable of simultaneously adjusting the distribution angle of light in two directions.

SUMMARY

A control device of an illumination system includes an illumination device capable of controlling a distribution angle of light emitted from a light source. The control device includes a detection device including a distribution angle adjustment region for the illumination device on an XY plane with a predetermined position as the origin in a detection region provided with a plurality of detection elements arranged in an X direction and a Y direction, a display panel including a display region overlapping the detection region in plan view, the display panel being provided with a distribution angle adjustment object in a region overlapping the distribution angle adjustment region in the display region, and a processing device configured to generate distribution angle data for controlling a distribution angle of the illumination device in accordance with a movement amount of the distribution angle adjustment object in the X and Y directions on the XY plane.

DETAILED DESCRIPTION

Aspects (embodiments) of the present disclosure will be described below in detail with reference to the accompanying drawings. Contents described below in the embodiments do not limit the present disclosure. Components described below include those that could be easily thought of by the skilled person in the art and those identical in effect. Components described below may be combined as appropriate. What is disclosed herein is merely exemplary, and any modification that could be easily thought of by the skilled person in the art as appropriate without departing from the gist of the disclosure is contained in the scope of the present disclosure. For clearer description, the drawings are schematically illustrated for the width, thickness, shape, and the like of each component as compared to an actual aspect in some cases, but the drawings are merely exemplary and do not limit interpretation of the present disclosure. In the present specification and drawings, any element same as that already described with reference to an already described drawing is denoted by the same reference sign, and detailed description thereof is omitted as appropriate in some cases.

Figure 1A:
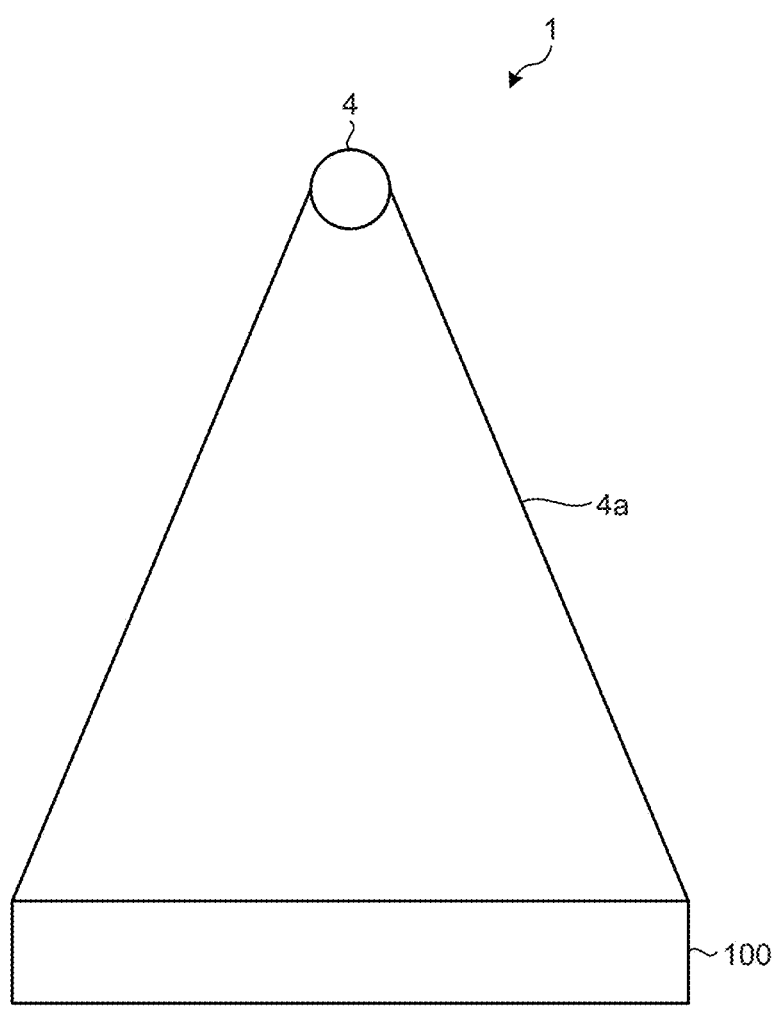
FIG. 1A is a side view illustrating an example of an illumination device according to an embodiment.

FIG. 1A is a side view illustrating an example of an illumination device according to an embodiment. This illumination device 1 according to the embodiment is an illumination instrument having what is called a light adjustment function. As illustrated in FIG. 1A, an illumination device 1 includes a light source 4, a reflector 4a, and a light modulation device 100.

The light source 4 is constituted by, for example, a light emitting diode (LED). In the present disclosure, the light source 4 is capable of adjusting the intensity (hereinafter also referred to as "light emission intensity") of light emitted from the illumination device 1. The reflector 4a is a component through which light from the light source 4 is condensed to the light modulation device 100.

The light source 4 may include LEDs in three colors of red (R), green (G), and blue (B), for example. The light source 4 may be capable of adjusting the white balance and emission color of light emitted from the illumination device 1.

Figure 1B:
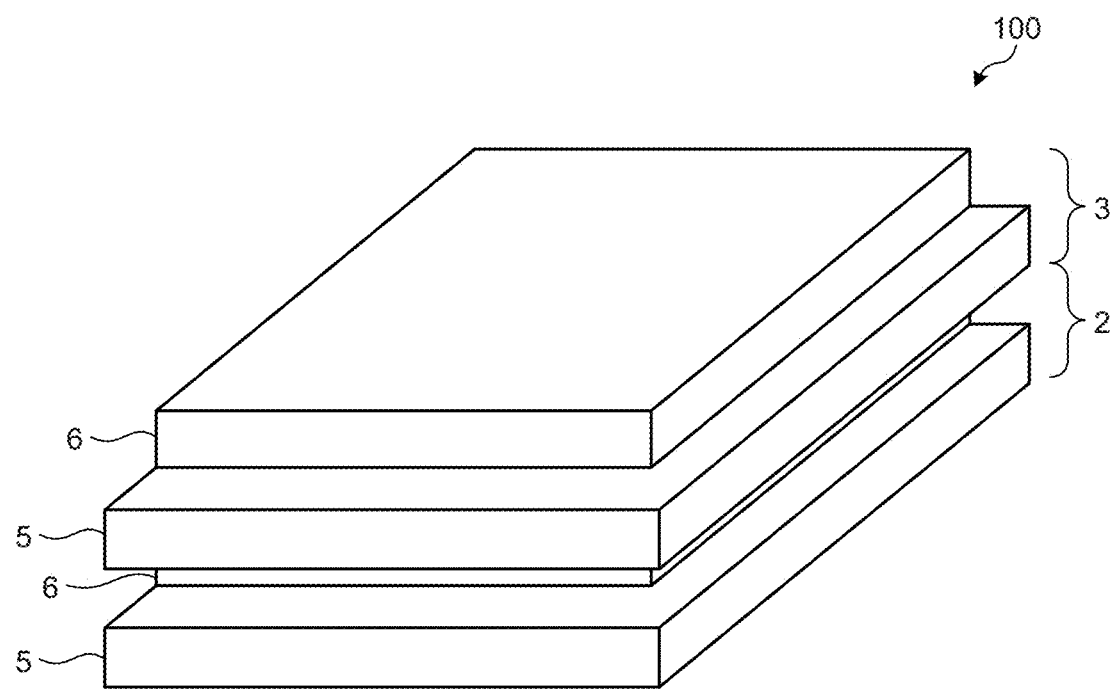
FIG. 1B is a perspective view illustrating an example of a light modulation device according to the embodiment.

FIG. 1B is a perspective view illustrating an example of a light modulation device according to the embodiment. As illustrated in FIG. 1B, the light modulation device 100 includes a first liquid crystal cell 2 and a second liquid crystal cell 3. In the present disclosure, the light modulation device 100 is capable of adjusting the distribution angle of light emitted from the illumination device 1.

In FIG. 1B, a Dz direction represents the irradiation direction of light from the light source 4 and the reflector 4a. The light modulation device 100 is constituted by stacking the first liquid crystal cell 2 and the second liquid crystal cell 3 in the Dz direction. In FIG. 1, one direction in a plane parallel to a stacking plane of the first liquid crystal cell 2 and the second liquid crystal cell 3 orthogonal to the Dz direction is defined as a Dx direction, and a direction orthogonal to the Dx direction and the Dz direction is defined as a Dy direction.

The first liquid crystal cell 2 and the second liquid crystal cell 3 have the same configuration. In the present embodiment, the first liquid crystal cell 2 is a liquid crystal cell for p wave polarization. The second liquid crystal cell 3 is a liquid crystal cell for s wave polarization. Note that the first liquid crystal cell 2 may be a liquid crystal cell for s wave polarization, and the second liquid crystal cell 3 may be a liquid crystal cell for p wave polarization. It is only needed that one of the first liquid crystal cell 2 and the second liquid crystal cell 3 is a liquid crystal cell for p wave polarization and the other is a liquid crystal cell for s wave polarization.

Figure 2:
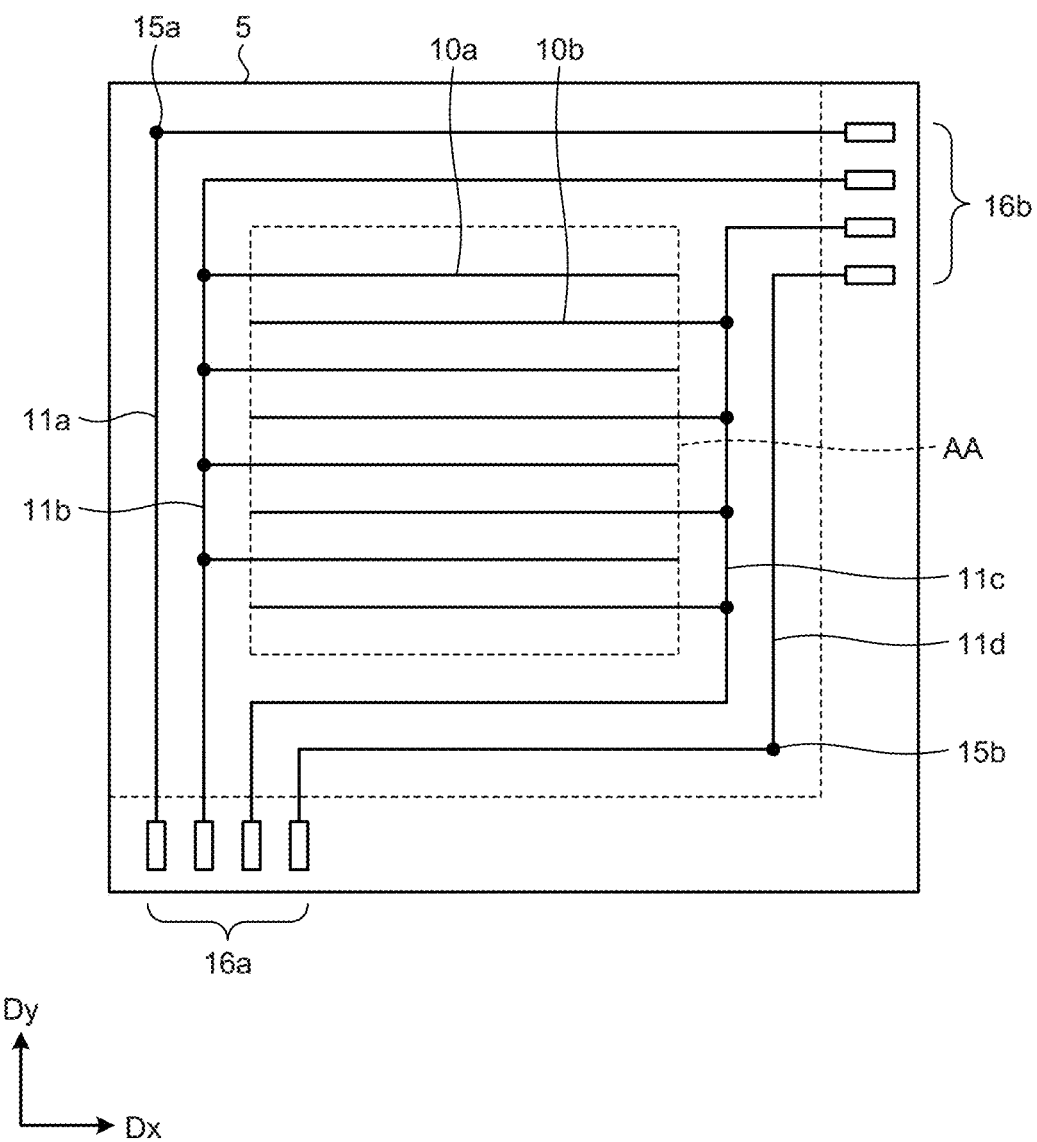
FIG. 2 is a schematic plan view of a first substrate when viewed in a Dz direction.
Figure 3:
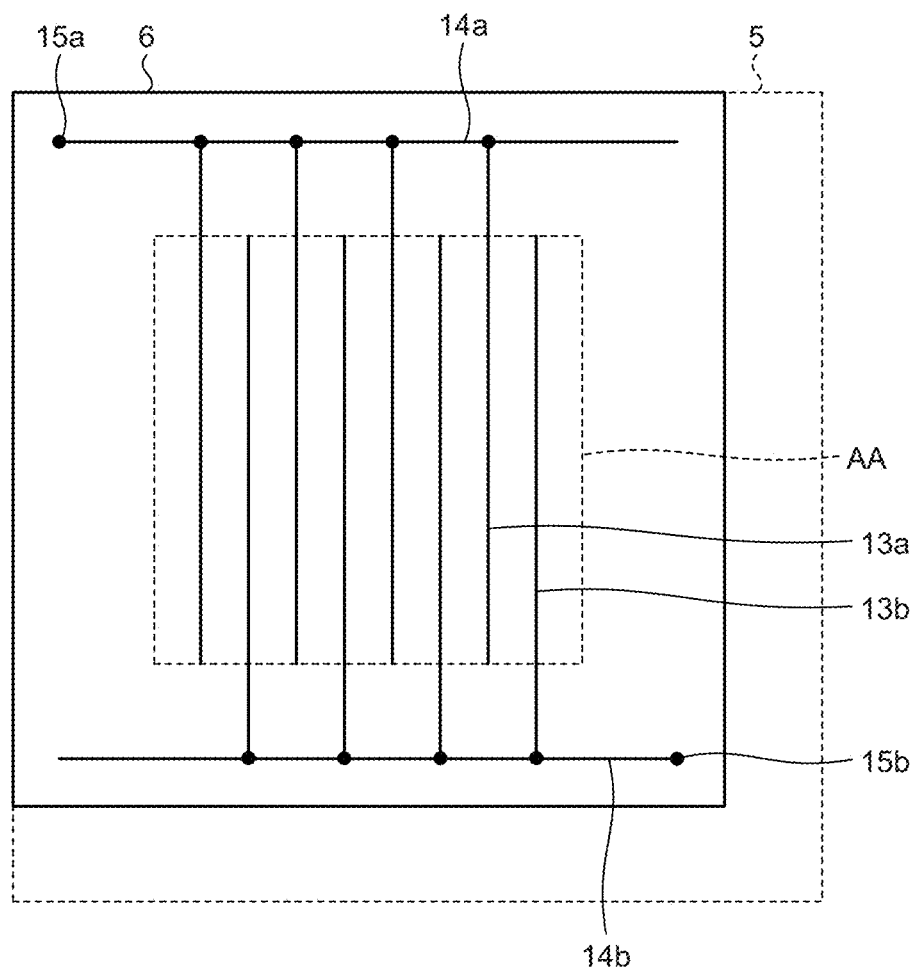
FIG. 3 is a schematic plan view of a second substrate when viewed in the Dz direction.
Figure 3:
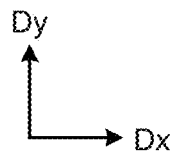
Figure 4:
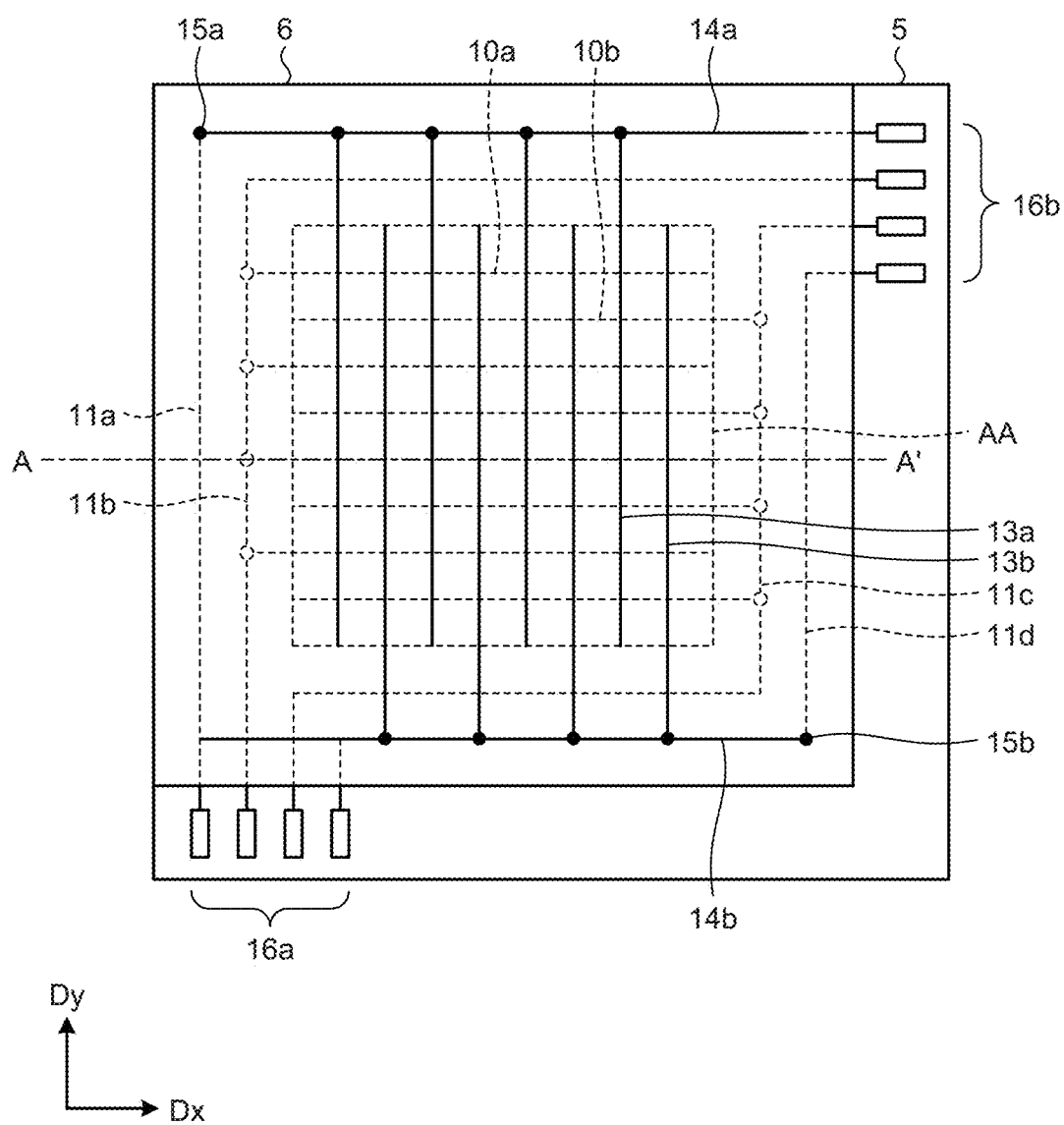
FIG. 4 is a fluoroscopic diagram of a liquid crystal cell in which the first substrate and the second substrate are placed over in the Dz direction.
Figure 5:
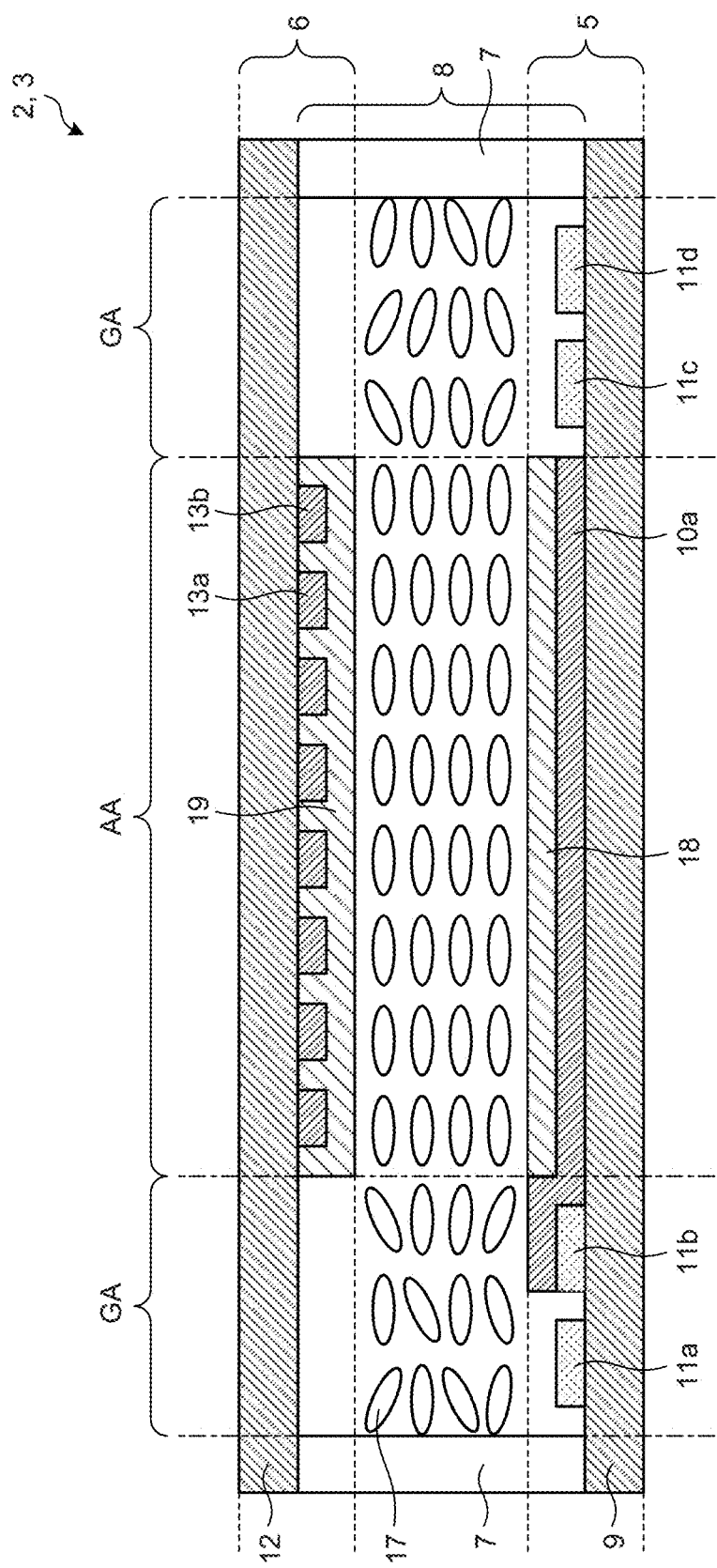
FIG. 5 is a sectional view along line A-A' illustrated in FIG. 4.

The first liquid crystal cell 2 and the second liquid crystal cell 3 each include a first substrate 5 and a second substrate 6. FIG. 2 is a schematic plan view of the first substrate when viewed in the Dz direction. FIG. 3 is a schematic plan view of the second substrate when viewed in the Dz direction. FIG. 4 is a fluoroscopic diagram of a liquid crystal cell in which the first substrate and the second substrate are placed over in the Dz direction. FIG. 5 is a sectional view along line A-A' illustrated in FIG. 4.

As illustrated in FIG. 5, the first liquid crystal cell 2 and the second liquid crystal cell 3 each include a liquid crystal layer 8 having a periphery sealed by a sealing member 7 between the first substrate 5 and the second substrate 6.

The liquid crystal layer 8 modulates light passing through the liquid crystal layer 8 in accordance with the state of electric field. The liquid crystal layer 8 may be, for example, of a horizontal electric field mode such as fringe field switching (FFS), which is a form of in-plane switching (IPS), or may be of a vertical electric field mode. Liquid crystal of various modes such as twisted nematic (TN), vertical alignment (VA), and electrically controlled birefringence (ECB) may be used and is not limited by the kind and configuration of the liquid crystal layer 8.

As illustrated in FIG. 2, a plurality of drive electrodes 10a and 10b, a plurality of metal wires 11a and 11b that supply drive voltage applied to these drive electrodes 10, and a plurality of metal wires 11c and 11d that supply drive voltage applied to a plurality of drive electrodes 13a and 13b (refer to FIG. 3) provided at the second substrate 6 to be described later are provided on the liquid crystal layer 8 side of a base material 9 of the first substrate 5 illustrated in FIG. 5. The metal wires 11a, 11b, 11c, and 11d are provided in a wiring layer of the first substrate 5. The metal wires 11a, 11b, 11c, and 11d are provided at intervals in the wiring layer on the first substrate 5. Hereinafter, the drive electrodes 10a and 10b are simply referred to as "drive electrodes 10" in some cases. In addition, the metal wires 11a, 11b, 11c, and 11d are referred to as "first metal wires 11" in some cases. As illustrated in FIG. 2, the drive electrodes 10 on the first substrate 5 extend in the Dx direction.

As illustrated in FIG. 3, the drive electrodes 13a and 13b and a plurality of metal wires 14a and 14b that supply drive voltage applied to these drive electrodes 13 are provided on the liquid crystal layer 8 side of a base material 12 of the second substrate 6 illustrated in FIG. 5. The metal wires 14a and 14b are provided in a wiring layer of the second substrate 6. The metal wires 14a and 14b are provided at intervals in the wiring layer on the second substrate 6. Hereinafter, the drive electrodes 13a and 13b are simply referred to as "drive electrodes 13" in some cases. In addition, the metal wires 14a and 14b are referred to as "second metals wire 14" in some cases. As illustrated in FIG. 3, the drive electrodes 13 on the second substrate 6 extend in the Dy direction.

The drive electrodes 10 and 13 are translucent electrodes formed of a translucent conductive material (translucent conductive oxide) such as indium tin oxide (ITO). The first substrate 5 and the second substrate 6 are translucent substrates of glass, resin, or the like. The first metal wires 11 and the second metal wires 14 are formed of at least one metallic material among aluminum (Al), copper (Cu), silver (Ag), molybdenum (Mo), and alloy thereof. The first metal wires 11 and the second metal wires 14 may be each formed of one or more of these metallic materials as a multilayered body of a plurality of layers. The at least one metallic material among aluminum (Al), copper (Cu), silver (Ag), molybdenum (Mo), and alloy thereof has a resistance lower than that of translucent conductive oxide such as ITO.

The metal wire 11a of the first substrate 5 and the metal wire 14a of the second substrate 6 are coupled to each other through a conduction part 15a such as a via. The metal wire 11d of the first substrate 5 and the metal wire 14b of the second substrate 6 are coupled to each other through a conduction part 15b such as a via.

Coupling (Flex-on-Board) terminal parts 16a and 16b coupled to non-illustrated flexible printed circuits (FPC) are provided in a region on the first substrate 5, which does not overlap the second substrate 6 in the Dz direction. The coupling terminal parts 16a and 16b each include four coupling terminals corresponding to the metal wires 11a, 11b, 11c, and 11d.

The coupling terminal parts 16a and 16b are provided in the wiring layer of the first substrate 5. Drive voltage applied to the drive electrodes 10a and 10b on the first substrate 5 and the drive electrodes 13a and 13b on the second substrate 6 is supplied from the FPC coupled to the coupling terminal part 16a or 16b to the first liquid crystal cell 2 and the second liquid crystal cell 3. Hereinafter, the coupling terminal parts 16a and 16b are simply referred to as "coupling terminal parts 16" in some cases.

As illustrated in FIG. 4, in the first liquid crystal cell 2 and the second liquid crystal cell 3, the first substrate 5 overlaps the second substrate 6 in the Dz direction (light irradiation direction), and the drive electrodes 10 on the first substrate 5 intersect the drive electrodes 13 on the second substrate 6 when viewed in the Dz direction. In the first liquid crystal cell 2 and the second liquid crystal cell 3 thus configured, the orientation direction of liquid crystal molecules 17 in the liquid crystal layer 8 can be controlled by supplying drive voltage to each of the drive electrodes 10 on the first substrate 5 and the drive electrodes 13 on the second substrate 6. A region in which the orientation direction of the liquid crystal molecules 17 in the liquid crystal layer 8 be can controlled is referred to as a "light modulation region AA". Light transmitting through the light modulation region AA of each of the first liquid crystal cell 2 and the second liquid crystal cell 3 can be controlled with change of refractive index distribution of the liquid crystal layer 8 in the light modulation region AA. A region outside the light modulation region AA where the liquid crystal layer 8 is sealed by the sealing member 7 is referred to as a "peripheral region GA" (refer to FIG. 5).

As illustrated in FIG. 5, the drive electrodes 10 (in FIG. 5, the drive electrode 10a) are covered by an alignment film 18 in the light modulation region of the first substrate 5. In addition, the drive electrodes 13 (in FIG. 5, the drive electrodes 13a and 13b) are covered by an alignment film 19 in the light modulation region of the second substrate 6. The alignment film 18 and the alignment film 19 have different rubbing directions.

Figure 6A:
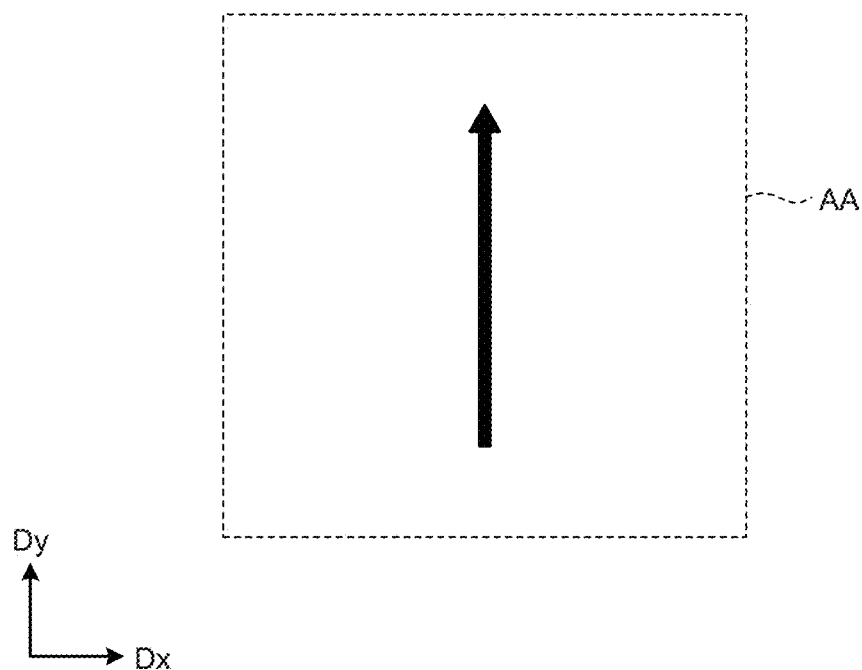
FIG. 6A is a diagram illustrating a rubbing direction of an alignment film of the first substrate.
Figure 6B:
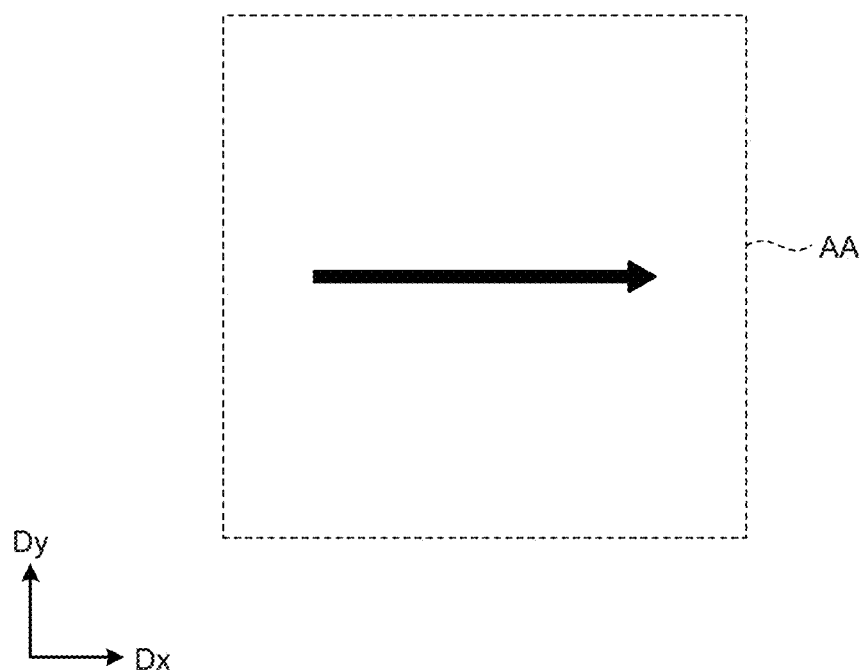
FIG. 6B is a diagram illustrating a rubbing direction of an alignment film of the second substrate.

FIG. 6A is a diagram illustrating the rubbing direction of the alignment film of the first substrate. FIG. 6B is a diagram illustrating the rubbing direction of the alignment film of the second substrate.

As illustrated in FIGS. 6A and 6B, the rubbing direction of the alignment film 18 of the first substrate and the rubbing direction of the alignment film 19 of the second substrate are directions intersecting each other in plan view. Specifically, the rubbing direction of the alignment film 18 of the first substrate 5 illustrated in FIG. 6A is orthogonal to the extension direction of the drive electrodes 10a and 10b. The rubbing direction of the alignment film 19 of the second substrate 6 illustrated in FIG. 6B is orthogonal to the extension direction of the drive electrodes 13a and 13b.

Note that, the present embodiment describes the configuration in which one first liquid crystal cell 2 and one second liquid crystal cell 3 are stacked, but is not limited to this configuration, and for example, a configuration including a plurality of combinations of the first liquid crystal cell 2 and the second liquid crystal cell 3 stacked on each other is also applicable. For example, a configuration including two combinations of the first liquid crystal cell 2 and the second liquid crystal cell 3 stacked on each other, in other words, a configuration including two liquid crystal cells for p wave polarization and two liquid crystal cells for s wave polarization is applicable.

In the present disclosure, the distribution angle of light emitted from the light source 4 is controlled through drive voltage control of the first liquid crystal cell 2 and the second liquid crystal cell 3 in the illumination device 1 having the above-described configuration. The following describes the distribution angle of light from the illumination device 1, which is one of control parameters in the present disclosure, with reference to FIG. 7.

Figure 7:
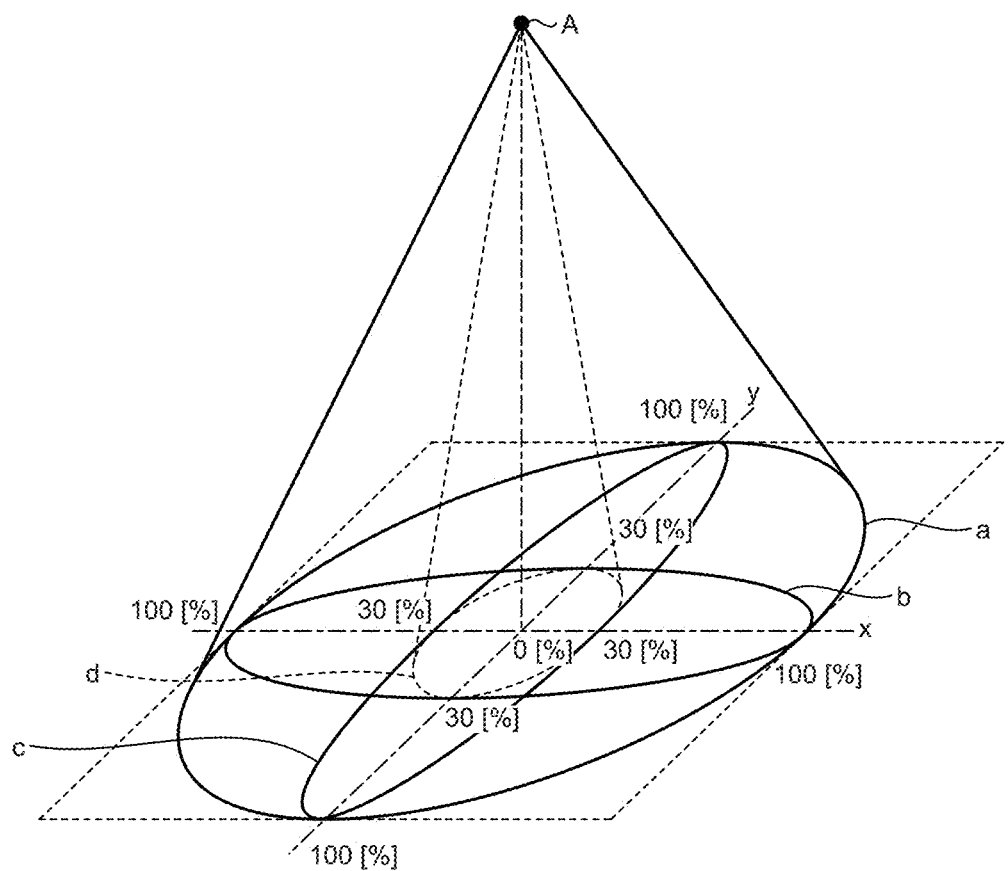
FIG. 7 is a conceptual diagram for conceptually describing the distribution angle of light from the illumination device according to the embodiment.
Figure 7:
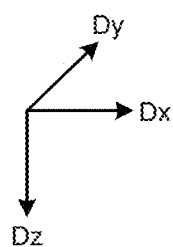

FIG. 7 is a conceptual diagram for conceptually describing the distribution angle of light from the illumination device according to the embodiment. In FIG. 7, the illumination device 1 is regarded as a point light source A, and the irradiation area of light on a virtual plane xy orthogonal to the Dz direction is illustrated. Note that, although FIG. 7 illustrates the example in which the illumination device 1 is regarded as the point light source A, light transmitting through the light modulation region AA of each of the first liquid crystal cell 2 and the second liquid crystal cell 3 is controlled as described above in reality, and thus the illuminance of light decreases around the irradiation area. Furthermore, the outline of the irradiation area is indistinct due to light diffraction phenomenon and the like.

As described above, in each of the first liquid crystal cell 2 and the second liquid crystal cell 3, the orientation direction of the liquid crystal molecules 17 in the liquid crystal layer 8 is controlled by supplying drive voltage to each of the drive electrodes 10 on the first substrate 5 and the drive electrodes 13 on the second substrate 6. Accordingly, the distribution angle of light emitted from the illumination device 1 can be controlled.

Specifically, for example, the orientation direction of the liquid crystal molecules 17 in the liquid crystal layer 8 of the first liquid crystal cell 2 changes and the distribution angle in the Dx direction changes in accordance with drive voltage applied to the drive electrodes 10 and 13 of the first liquid crystal cell 2. In the present disclosure, the minimum distribution angle in the Dx direction is 0[%] and the maximum distribution angle in the Dx direction is 100[%].

For example, the orientation direction of the liquid crystal molecules 17 in the liquid crystal layer 8 of the second liquid crystal cell 3 changes and the distribution angle in the Dy direction changes in accordance with drive voltage applied to the drive electrodes 10 and 13 of the second liquid crystal cell 3. In the present disclosure, the minimum distribution angle in the Dy direction is 0[%] and the maximum distribution angle in the Dy direction is 100[%].

In FIG. 7, "a" exemplarily illustrates the irradiation area in a case where the distribution angle in the Dx direction and the distribution angle in the Dy direction are both 100[%]. In FIG. 7, "b" exemplarily illustrates the irradiation area in a case where the distribution angle in the Dx direction is 100[%] and the distribution angle in the Dy direction is 30[%]. In FIG. 7, "c" exemplarily illustrates the irradiation area in a case where the distribution angle in the Dx direction is 30[%] and the distribution angle in the Dy direction is 100[%]. In FIG. 7, "d" exemplarily illustrates the irradiation area in a case where the distribution angle in the Dx direction and the distribution angle in the Dy direction are both 30[%].

In this manner, the distribution angle of light in the Dx and Dy directions can be controlled by performing drive voltage control of each of the first liquid crystal cell 2 and the second liquid crystal cell 3 in the illumination device 1 having the above-described configuration. Accordingly, the irradiation area of light from the illumination device 1 can be changed.

First Embodiment

Figure 8:
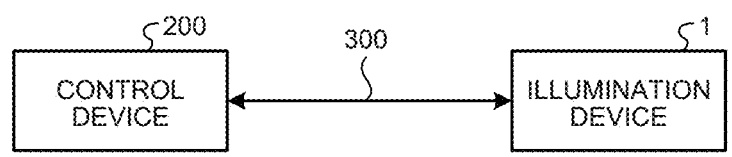
FIG. 8 is a schematic view illustrating an example of the configuration of an illumination system according to a first embodiment.

FIG. 8 is a schematic view illustrating an example of the configuration of an illumination system according to a first embodiment. The illumination system according to the first embodiment includes the illumination device 1 and a control device 200. The control device 200 is, for example, a portable communication terminal device such as a smartphone or a tablet.

Data and various command signals are transmitted and received between the illumination device 1 and the control device 200 through a communication means 300. In the present disclosure, the communication means 300 is a wireless communication means such as Bluetooth (registered trademark) or WiFi (registered trademark). Wireless communication may be performed between the illumination device 1 and the control device 200 through a predetermined network such as a mobile communication network. Alternatively, the illumination device 1 and the control device 200 may be coupled to each other in a wired manner to perform wired communication therebetween.

Figure 9:
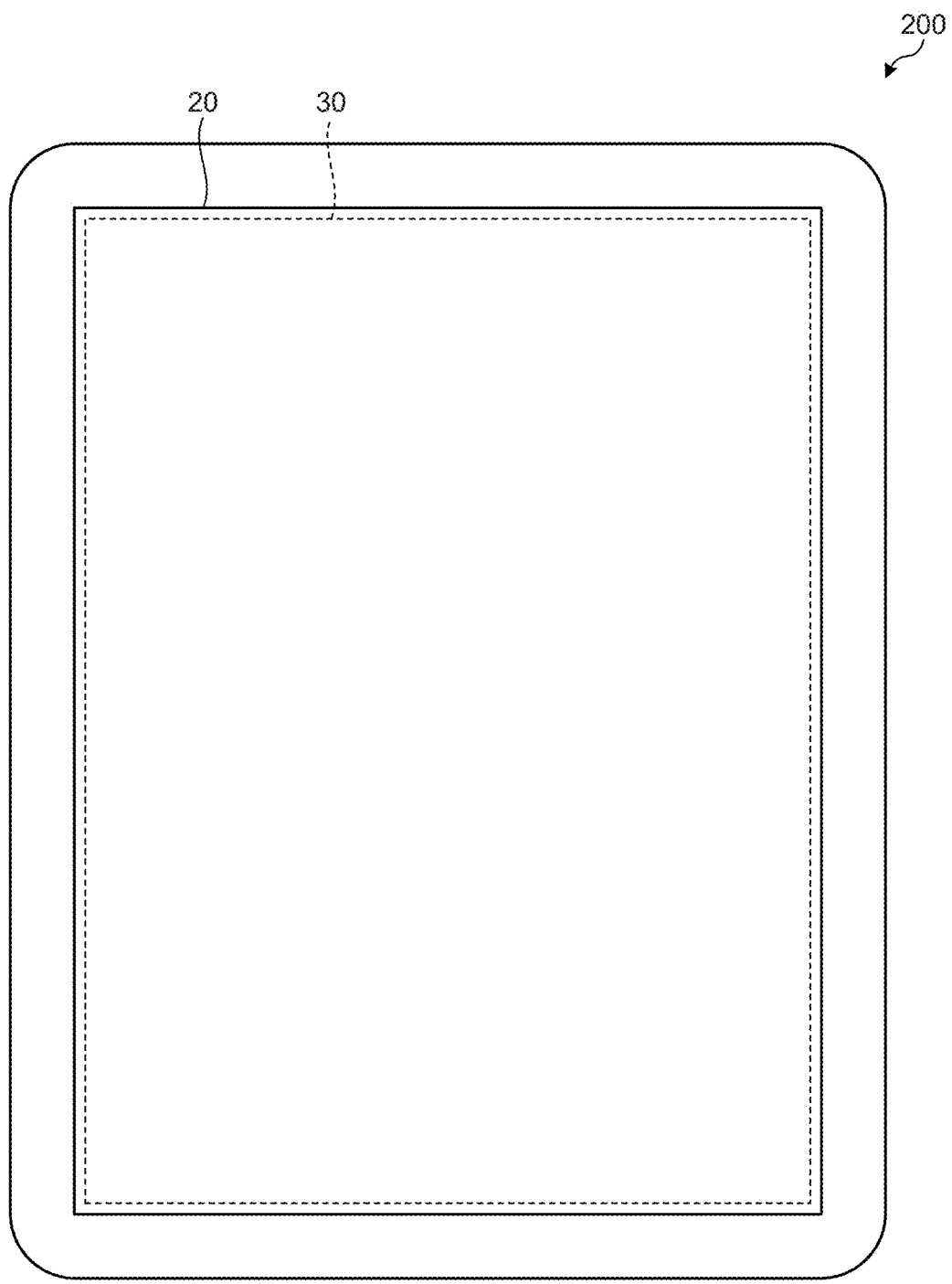
FIG. 9 is an exterior diagram illustrating an example of a control device.

FIG. 9 is an exterior diagram illustrating an example of the control device according to the first embodiment. The control device 200 is a display device equipped with a touch detection function, in which a display panel 20 and a touch sensor 30 are integrated. Specifically, the display panel 20 is what is called an in-cell type or hybrid type device in which the touch sensor 30 is built and integrated. The configuration in which the touch sensor 30 is built and integrated in the display panel 20 includes, for example, a configuration in which some members such as substrates and electrodes used as the display panel 20 and some members such as substrates and electrodes used as the touch sensor 30 are shared. Note that the display panel 20 may be what is called an on-cell type device in which the touch sensor 30 is mounted on a display device.

The display panel 20 is, for example, a liquid crystal display panel including a liquid crystal display element. The display panel 20 is not limited thereto but may be, for example, an organic EL display panel (OLED: organic light emitting diode) or an inorganic EL display panel (micro LED or mini LED).

The touch sensor 30 is, for example, a capacitive touch sensor. The touch sensor 30 is not limited thereto but may be, for example, a touch sensor of a resistance film scheme or a touch sensor of an ultrasonic wave scheme or an optical scheme.

Figure 10:
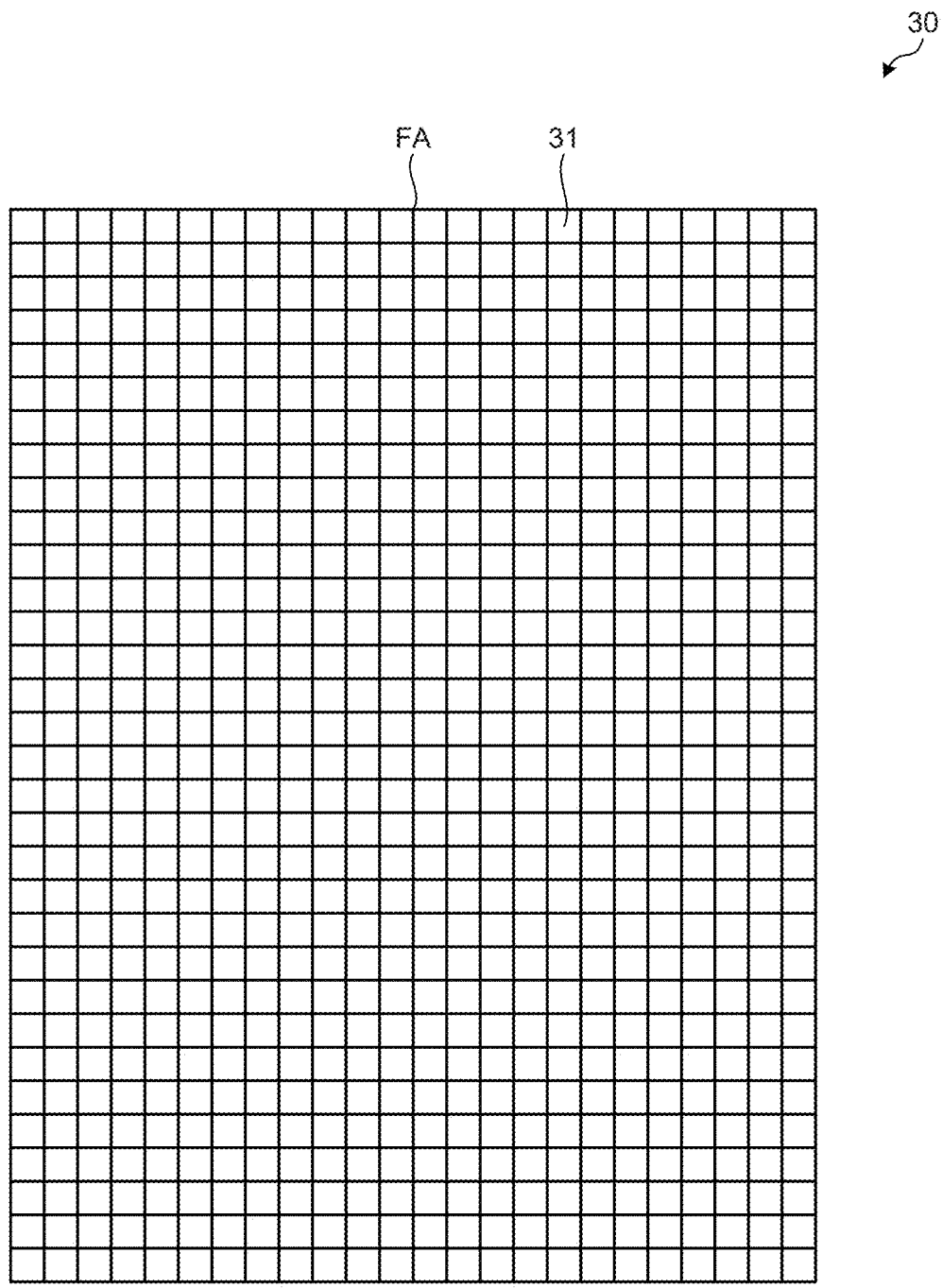
FIG. 10 is a conceptual diagram illustrating an example of a detection region of a touch sensor.

FIG. 10 is a conceptual diagram illustrating an example of a detection region of the touch sensor. A plurality of detection elements 31 are provided in a detection region FA of the touch sensor 30. In the detection region FA of the touch sensor 30, the detection elements 31 are arranged in an X direction (first direction) and a Y direction (second direction) orthogonal to the X direction and provided in a matrix of rows and columns. In other words, the touch sensor 30 includes the detection region FA overlapping the detection elements 31 arranged in the X direction (first direction) and the Y direction (second direction).

Figure 11:
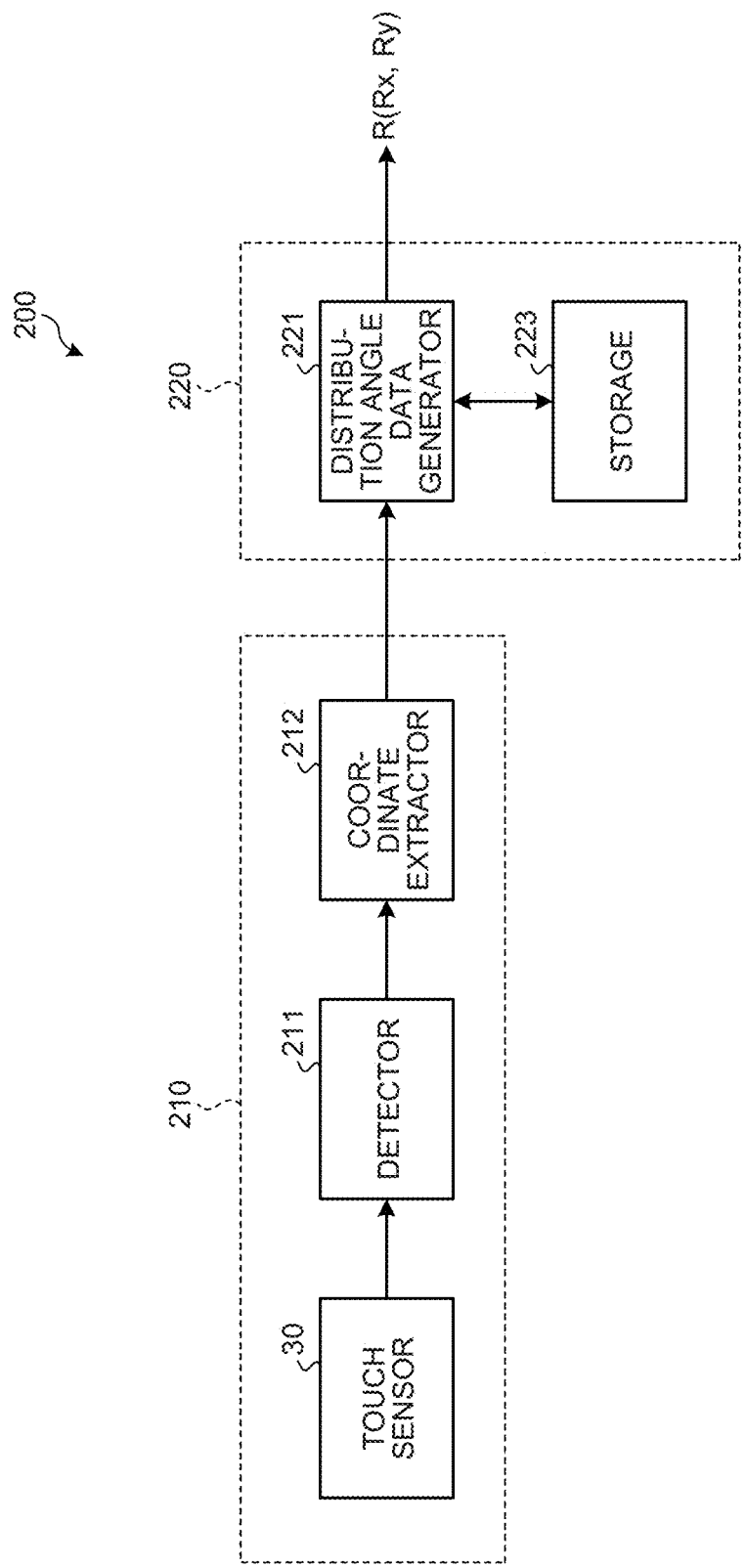
FIG. 11 is a diagram illustrating an example of a control block configuration of the control device.

FIG. 11 is a diagram illustrating an example of a control block configuration of the control device.

As illustrated in FIG. 11, the control device 200 according to the embodiment includes a detection device 210 and a processing device 220. The detection device 210 includes the touch sensor 30, a detector 211, and a coordinate extractor 212. The processing device 220 includes a distribution angle data generator 221 and a storage 223. The detector 211 and the coordinate extractor 212 of the detection device 210 are each constituted by, for example, a detection IC. The processing device 220 includes, for example, a central processing unit (CPU), a random access memory (RAM), an electrically erasable programmable read only memory (EEPROM), and a read only memory (ROM) of the smartphone, the tablet, or the like as the control device 200.

The detector 211 is a circuit configured to detect existence of a touch on the touch sensor 30 based on a detection signal output from each detection element 31 of the touch sensor 30.

The coordinate extractor 212 is a logic circuit configured to calculate the coordinate of a touch detection position when a touch is detected by the detector 211.

The distribution angle data generator 221 generates distribution angle data for controlling the distribution angle of the illumination device 1 based on the touch detection position extracted by the coordinate extractor 212. The distribution angle data generator 221 is a component implemented by, for example, the CPU of the smartphone, the tablet, or the like as the control device 200.

The storage 223 is constituted by, for example, the RAM, EEPROM, or ROM of the smartphone, the tablet, or the like as the control device 200. In the present disclosure, the storage 223 stores, for example, the distribution angle data corresponding to the coordinate of the touch detection position extracted by the coordinate extractor 212.

Figure 12:
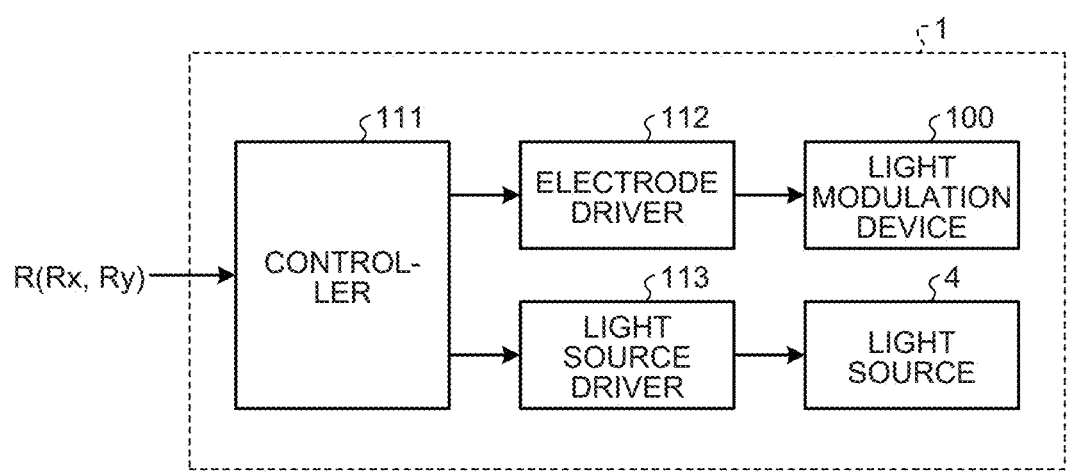
FIG. 12 is a diagram illustrating an example of a control block configuration of the illumination device.

FIG. 12 is a diagram illustrating an example of a control block configuration of the illumination device.

As illustrated in FIG. 12, the illumination device 1 according to the embodiment includes a controller 111, an electrode driver 112, and a light source driver 113 in addition to the light source 4 and the light modulation device 100 described above.

The controller 111 controls the electrode driver 112 so that drive voltage in accordance with distribution angle data R(Rx, Ry) transmitted from the control device 200 is supplied to the drive electrodes 10 and 13 of the first liquid crystal cell 2 and the second liquid crystal cell 3 of the light modulation device 100.

The controller 111 controls the light source driver 113 so that, for example, drive current in accordance with control parameters such as the intensity and color of light emission, which are transmitted from the control device 200 is supplied to the light source 4. The controller 111 may control the light source driver 113 so that drive current in accordance with the distribution angle data R(Rx, Ry) transmitted from the control device 200 is supplied to the light source 4.

A method of adjusting the distribution angle of light from the illumination device 1 in the above-described configuration according to the embodiment will be described below.

In the present disclosure, the distribution angle of light from the illumination device 1 is controlled in accordance with the movement amount of a touch detection position in a diffusion degree adjustment region TA of the touch sensor 30.

Figure 13:
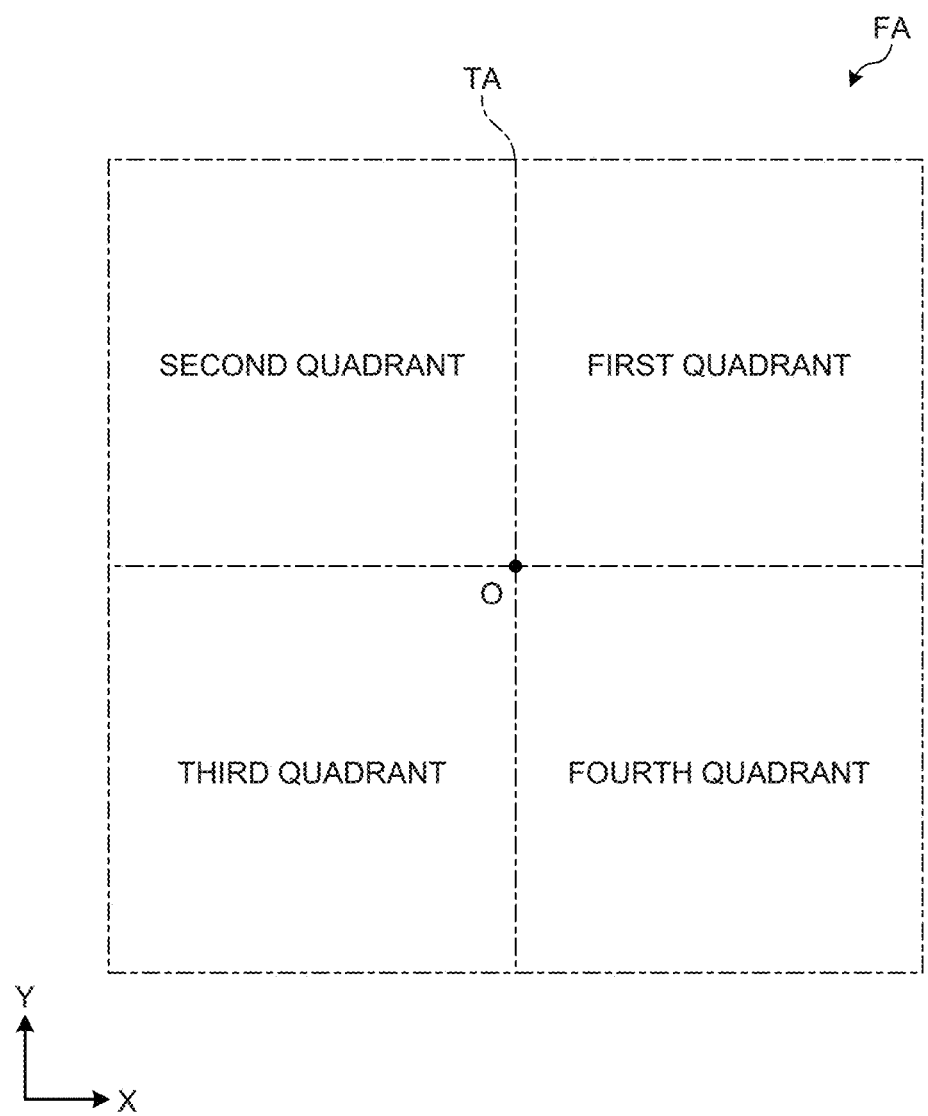
FIG. 13 is a conceptual diagram illustrating an example of a distribution angle adjustment region.

The distribution angle adjustment region TA of the illumination device 1 is provided in the detection region FA of the touch sensor 30. FIG. 13 is a conceptual diagram illustrating an example of the distribution angle adjustment region. As illustrated in FIG. 13, the distribution angle adjustment region TA is provided on an XY plane with a predetermined position as the origin O in the detection region FA. The distribution angle adjustment region TA only needs to be provided in the detection region FA of the touch sensor 30 and may be the entire detection region FA.

An X direction of the distribution angle adjustment region TA corresponds to the Dx direction of the illumination device 1. A Y direction of the distribution angle adjustment region TA corresponds to the Dy direction of the illumination device 1.

Figure 14:
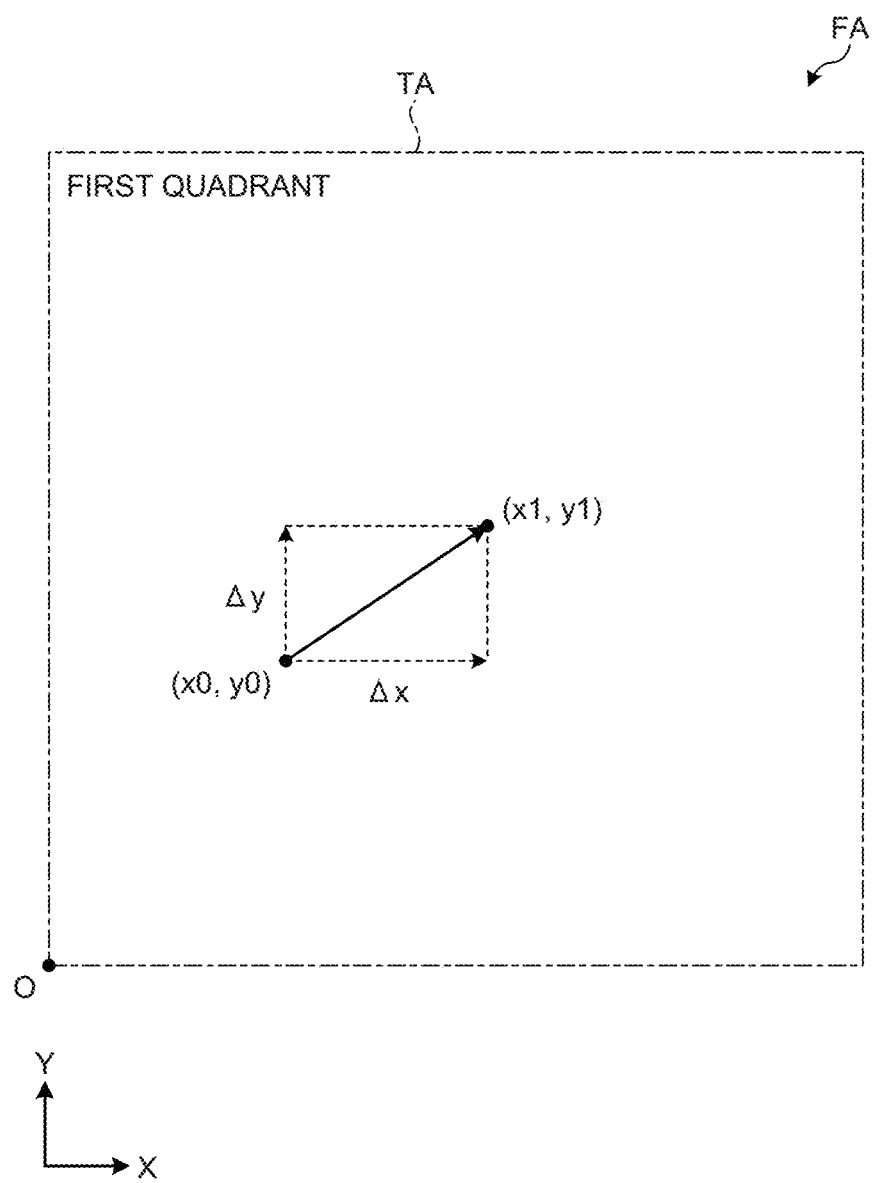
FIG. 14 is a conceptual diagram illustrating an example of a distribution angle adjustment method.

FIG. 14 is a conceptual diagram illustrating an example of the distribution angle adjustment method. The method of adjusting the distribution angle in the first quadrant of the XY plane on the distribution angle adjustment region TA will be described below with reference to FIG. 14.

In the present embodiment, the distribution angle data of the X and Y directions is discrete values obtained by normalizing information of the distribution angle controlled at the illumination device 1. Specifically, in the present embodiment, the distribution angle data generator 221 generates the distribution angle data R(Rx, Ry) for controlling the distribution angle of the illumination device 1.

In the example illustrated in FIG. 14, a touch detection position detected by the coordinate extractor 212 moves from a coordinate (x0, y0) to a coordinate (x1, y1) in the distribution angle adjustment region TA. In this case, the distribution angle data generator 221 generates the distribution angle data R(Rx, Ry) when the touch detection position moves from the coordinate (x0, y0) to the coordinate (x1, y1) in the distribution angle adjustment region TA. Specifically, the distribution angle data R(Rx, Ry) is expressed in the following Expressions (1) and (2) by using distribution angle data R'(Rx', Ry') before movement of the touch detection position. In the expressions, k is a coefficient determined by the number of detection elements 31 in the distribution angle adjustment region TA.

$$Rx = Rx' + k \times (x1 - x0) \quad (1)$$

$$Ry = Ry' + k \times (y1 - y0) \quad (2)$$

Specifically, in a case of k=4, for example, the distribution angle data changes by one step when the coordinate of the touch detection position moves by four. In other words, the change amount of the distribution angle data R(Rx, Ry) is proportional to the movement amount of the coordinate (x, y) of the touch detection position.

The control device 200 sequentially transmits the distribution angle data R(Rx, Ry) generated by the distribution angle data generator 221 to the illumination device 1 as a light adjustment control target.

FIGS. 15A, 15B, 15C, 15D, and 15E are each a conceptual diagram illustrating a display aspect for adjusting the distribution angle at the control device according to the first embodiment.

A display region DA that overlaps the detection region FA of the touch sensor 30 illustrated in FIG. 9 in plan view is provided on the display panel 20.

Figure 15A:
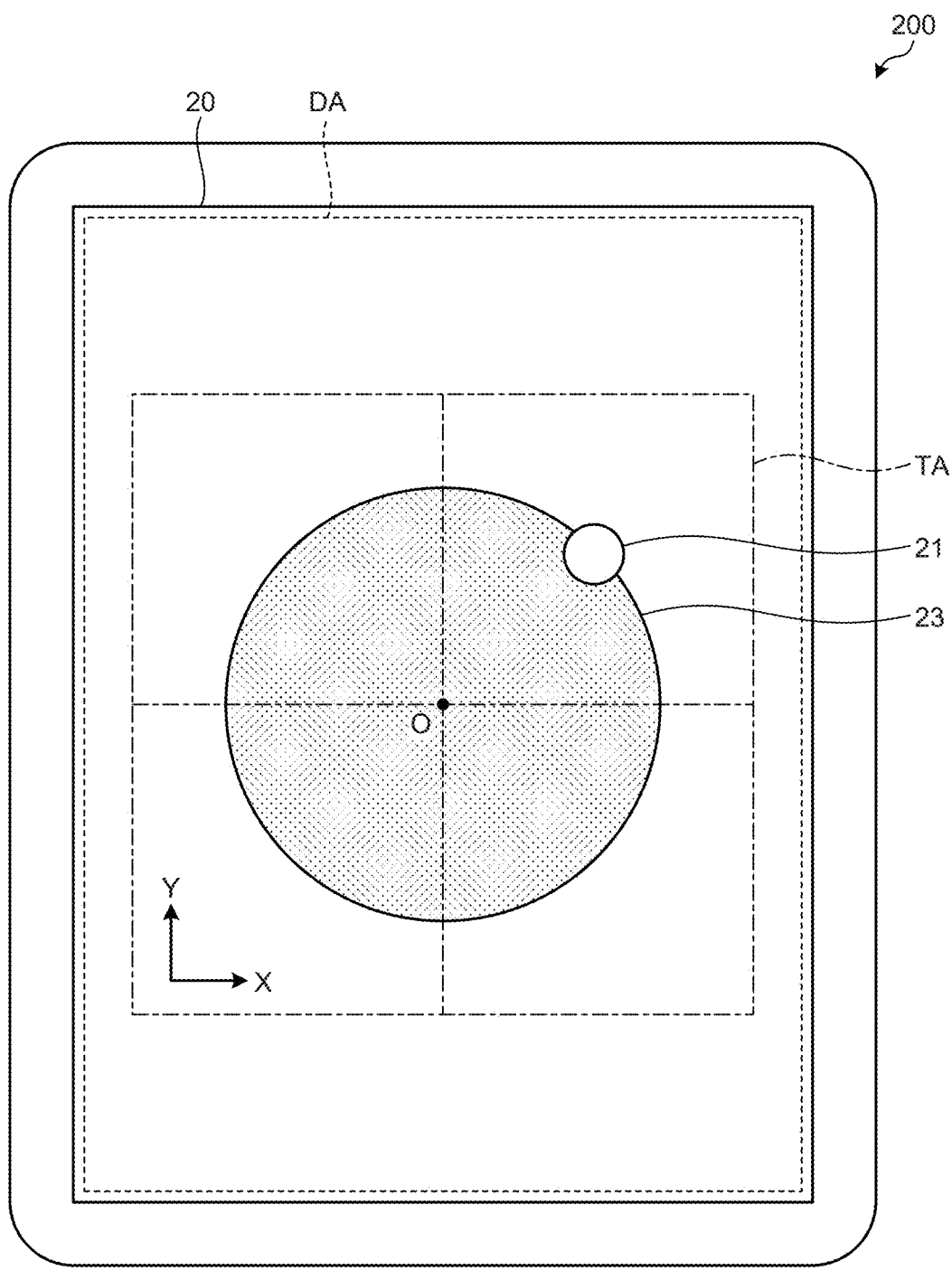
FIG. 15A is a conceptual diagram illustrating a display aspect of the control device according to the first embodiment for adjusting the distribution angle.

FIG. 15A illustrates an example in which a distribution angle adjustment object 21 configured to adjust the distribution angle of the illumination device 1 is provided in a region overlapping the first quadrant of the XY plane on the distribution angle adjustment region TA. The distribution angle adjustment object 21 is, for example, a distribution angle adjustment button displayed as an icon that can be moved (dragged) while being touched. The distribution angle of the illumination device 1 in the Dx and Dy directions can be simultaneously adjusted by touching and moving the distribution angle adjustment object 21 in the first quadrant of the XY plane on the distribution angle adjustment region TA.

Figure 15B:
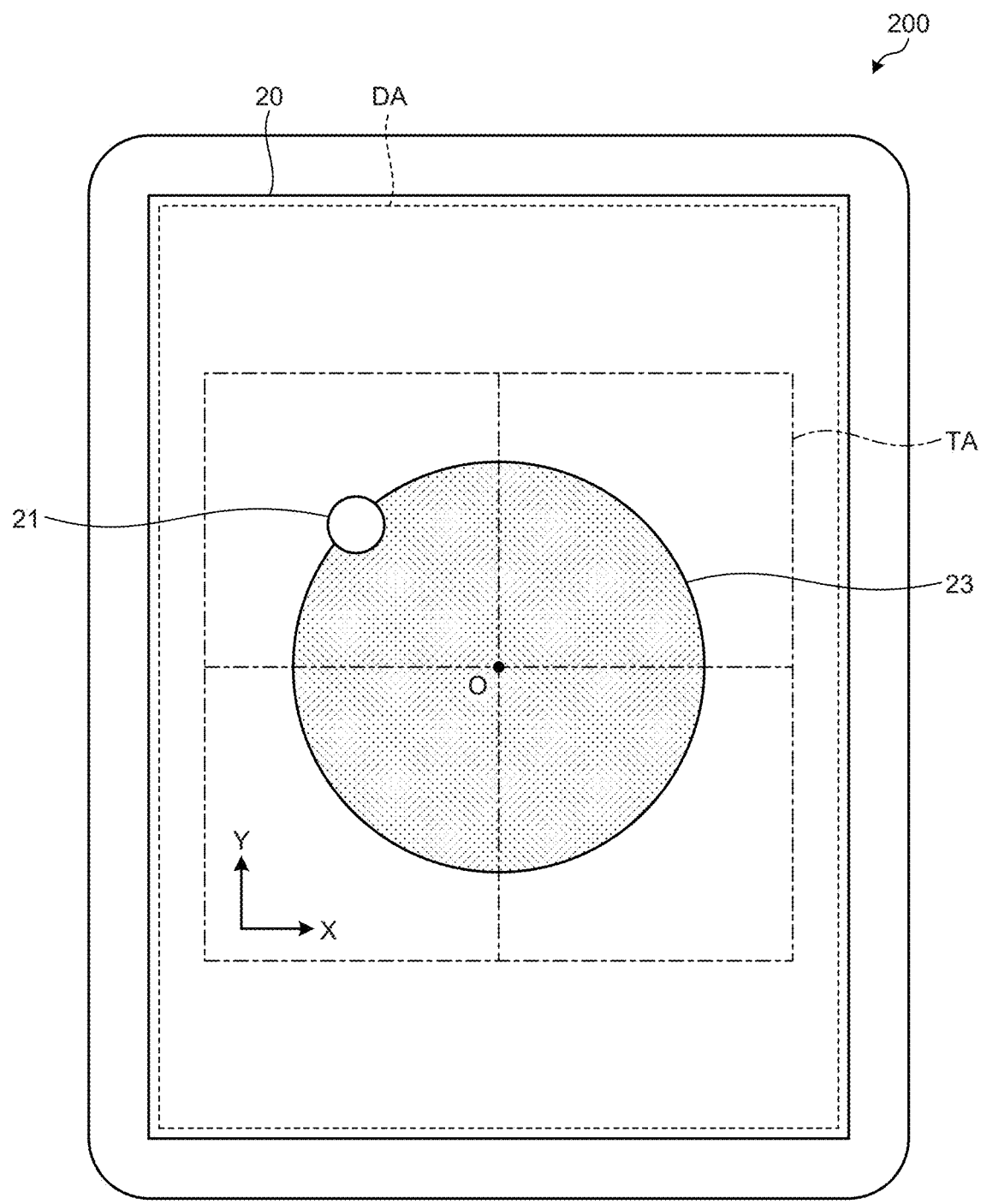
FIG. 15B is a conceptual diagram illustrating a display aspect of the control device according to the first embodiment for adjusting the distribution angle.

The distribution angle adjustment object 21 may be provided in a region overlapping the second quadrant of the XY plane on the distribution angle adjustment region TA as illustrated in FIG. 15B. In this case, the distribution angle of the illumination device 1 in the Dx and Dy directions can be simultaneously adjusted by touching and moving the distribution angle adjustment object 21 in the second quadrant of the XY plane on the distribution angle adjustment region TA.

Figure 15C:
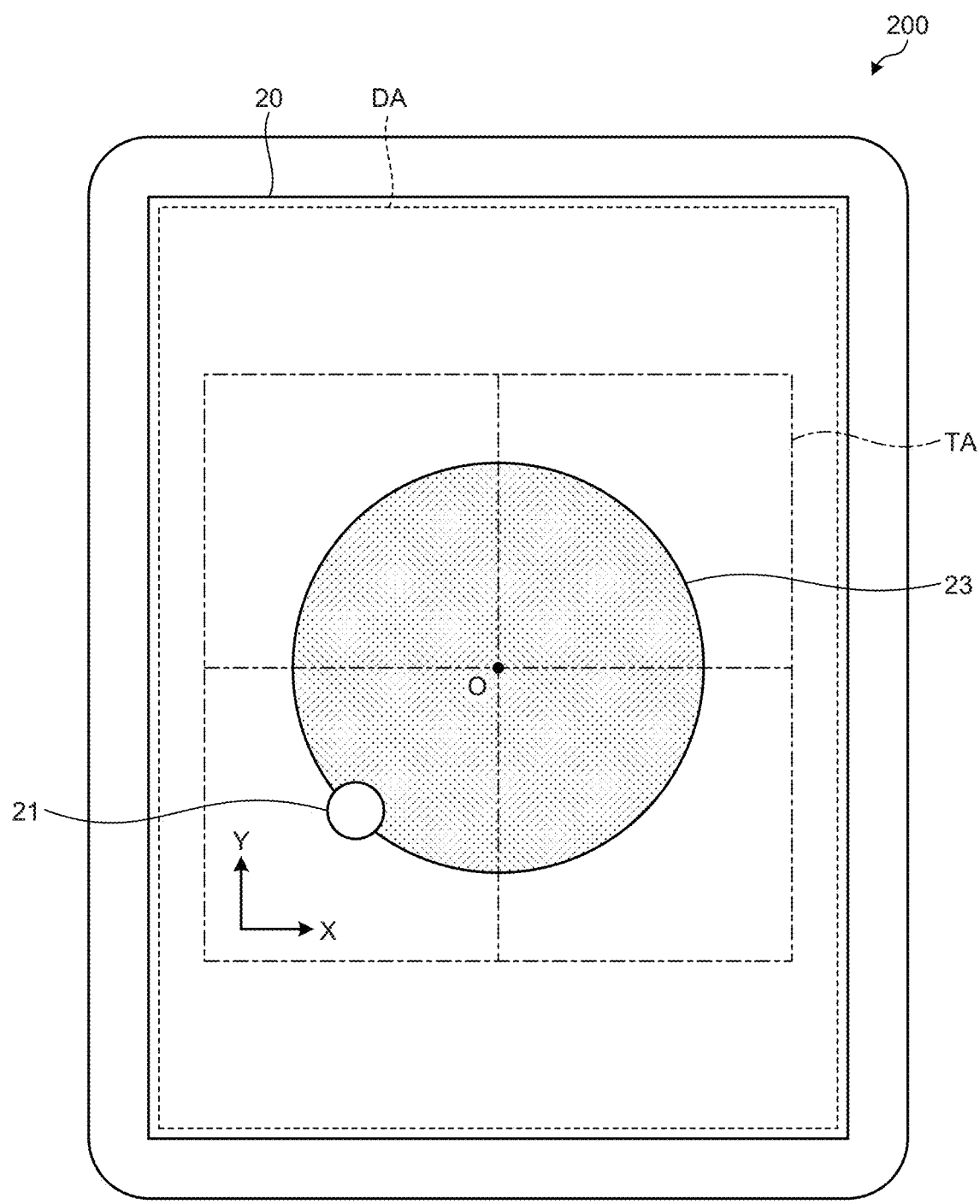
FIG. 15C is a conceptual diagram illustrating a display aspect of the control device according to the first embodiment for adjusting the distribution angle.

Alternatively, the distribution angle adjustment object 21 may be provided in a region overlapping the third quadrant of the XY plane on the distribution angle adjustment region TA as illustrated in FIG. 15C. In this case, the distribution angle of the illumination device 1 in the Dx and Dy directions can be simultaneously adjusted by touching and moving the distribution angle adjustment object 21 in the third quadrant of the XY plane on the distribution angle adjustment region TA.

Figure 15D:
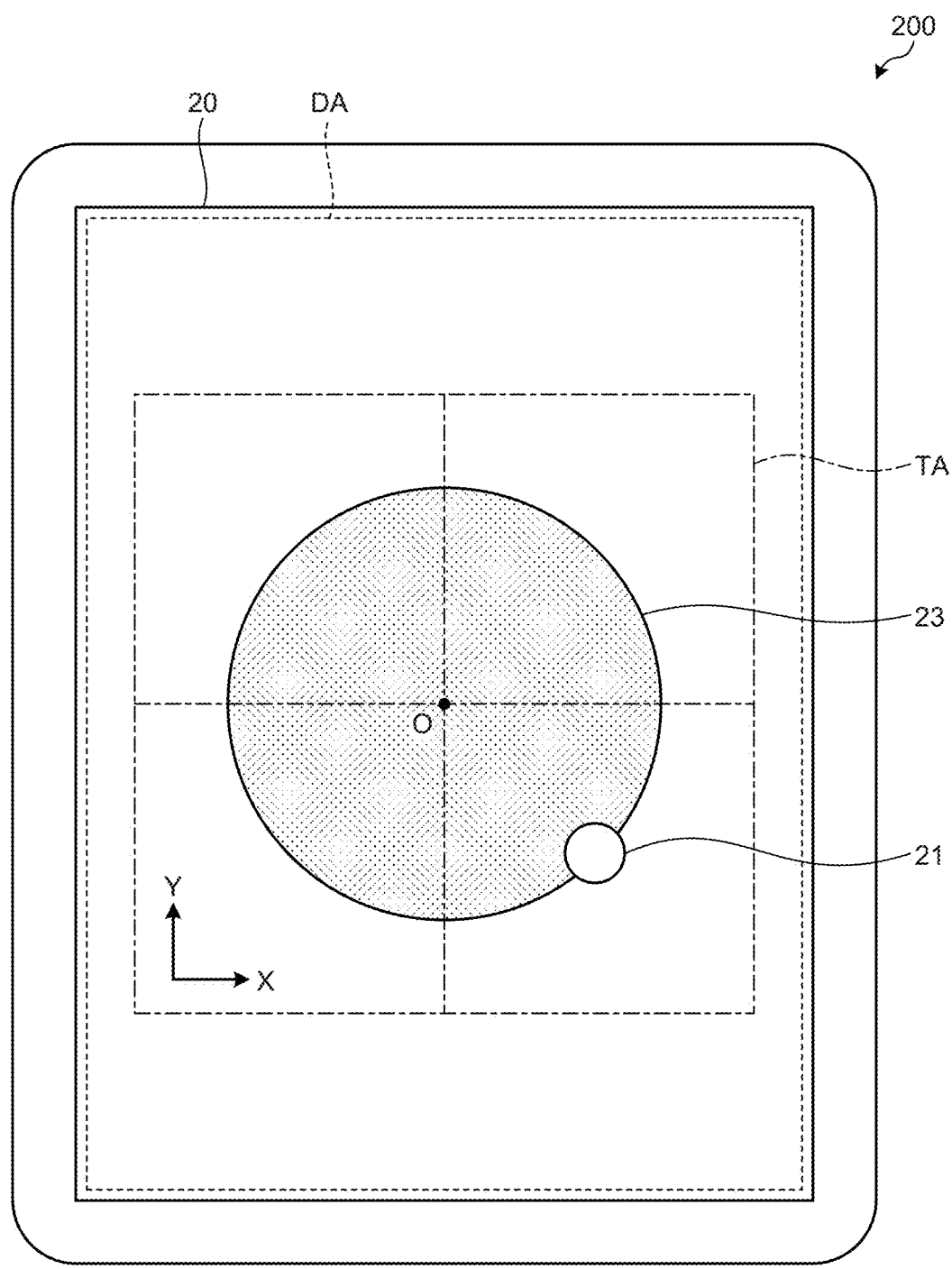
FIG. 15D is a conceptual diagram illustrating a display aspect of the control device according to the first embodiment for adjusting the distribution angle.

Alternatively, the distribution angle adjustment object 21 may be provided in a region overlapping the fourth quadrant of the XY plane on the distribution angle adjustment region TA as illustrated in FIG. 15D. In this case, the distribution angle of the illumination device 1 in the Dx and Dy directions can be simultaneously adjusted by touching and moving the distribution angle adjustment object 21 in the fourth quadrant of the XY plane on the distribution angle adjustment region TA.

Figure 15E:
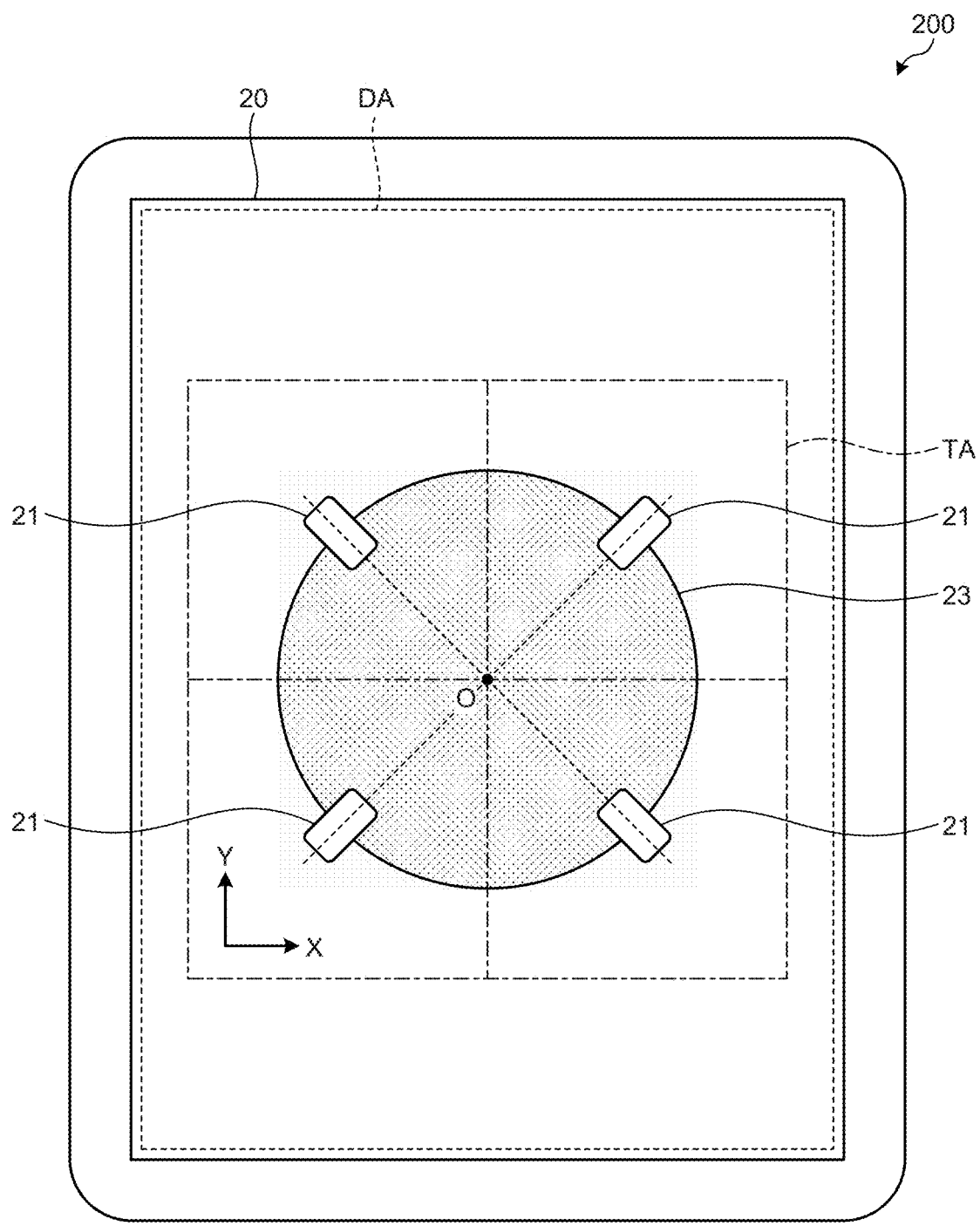
FIG. 15E is a conceptual diagram illustrating a display aspect of the control device according to the first embodiment for adjusting the distribution angle.

Alternatively, as illustrated in FIG. 15E, the distribution angle adjustment object 21 may be provided in each quadrant of the XY plane on the distribution angle adjustment region TA. In this case, the distribution angle of the illumination device 1 in the Dx and Dy directions can be simultaneously adjusted by touching and moving one of the distribution angle adjustment objects 21 in a quadrant in which the distribution angle adjustment object 21 is provided. Note that the shape of the distribution angle adjustment object 21 is a circle in FIGS. 15A, 15B, 15C, and 15D but may be a rectangle or rounded rectangle having long sides parallel to a line (dashed line illustrated in FIG. 15E) passing through the origin O of the XY plane as illustrated in FIG. 15E. Accordingly, the direction of adjusting the distribution angle is visually easily perceivable. The present disclosure is not limited by the shape of the distribution angle adjustment object 21.

In the examples illustrated in FIGS. 15A, 15B, 15C, 15D, and 15E, a schematically shaped image 23 of the irradiation area of light from the illumination device 1, which is obtained with the distribution angle is displayed in a region overlapping the distribution angle adjustment region TA, and the distribution angle adjustment object 21 is disposed on the outline of the schematically shaped image 23. Accordingly, an adjustment result of the distribution angle of the illumination device 1 can be visually understood.

Note that FIGS. 15A, 15B, 15C, 15D, and 15E exemplarily illustrate the schematically shaped image 23 when the distribution angle is equal in the Dx and Dy directions. In this case, the outline of the schematically shaped image 23 on the display panel 20 is a circle. Furthermore, in the example, the distribution angle adjustment object 21 is disposed at a position where the absolute value of the X-directional component is equal to the absolute value of the Y-directional component on the outline of the schematically shaped image 23, in other words, a position angled by 45 [deg] relative to each of the X and Y directions, but the position where the distribution angle adjustment object 21 is provided on the outline of the schematically shaped image 23 is not limited to the positions illustrated in FIGS. 15A, 15B, 15C, 15D, and 15E and the distribution angle adjustment object 21 may be provided at an optional position on the outline of the schematically shaped image 23 in any quadrant.

Figure 16:
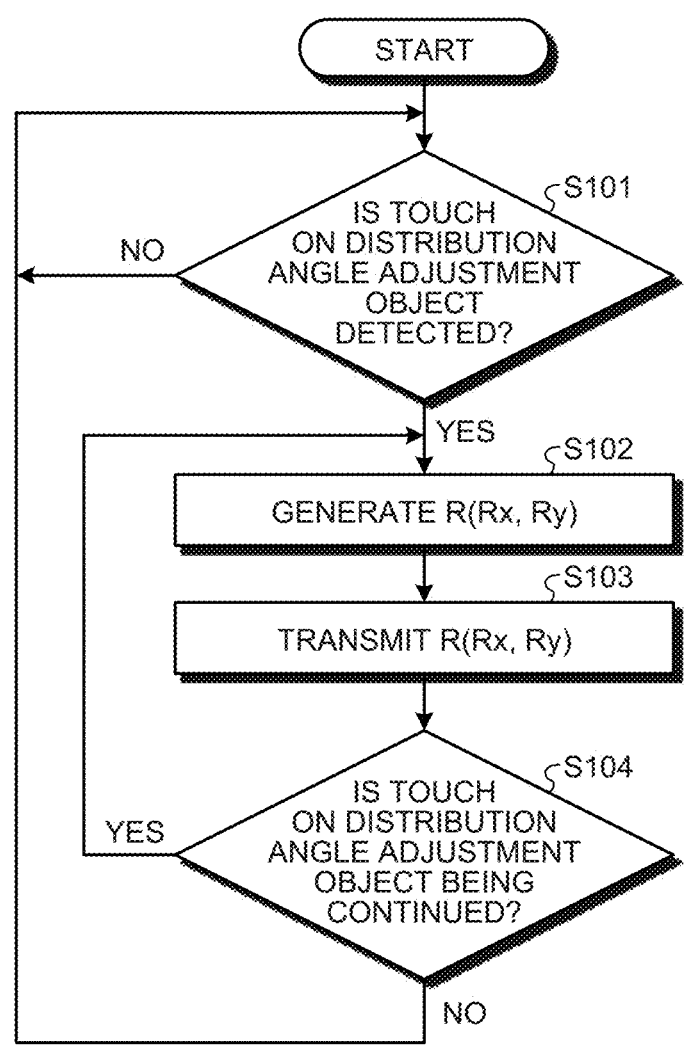
FIG. 16 is a flowchart illustrating an example of distribution angle adjustment processing according to the first embodiment.

FIG. 16 is a flowchart illustrating an example of distribution angle adjustment processing according to the first embodiment.

The detector 211 detects existence of touch on the distribution angle adjustment object 21 (step S101). In a case where no touch on the distribution angle adjustment object 21 is detected (No at step S101), the control device 200 repeatedly executes processing at step S101.

In a case where touch on the distribution angle adjustment object 21 is detected (Yes at step S101), the distribution angle data generator 221 generates the distribution angle data R(Rx, Ry) in accordance with the movement amount of the distribution angle adjustment object 21 extracted by the coordinate extractor 212 (step S102). Specifically, the distribution angle data generator 221 adds the movement amount of the distribution angle adjustment object 21 to the current distribution angle of the illumination device 1.

The control device 200 transmits the distribution angle data R(Rx, Ry) generated by the distribution angle data generator 221 to the illumination device 1 through the communication means 300 (step S103).

The detector 211 detects whether the touch on the distribution angle adjustment object 21 is being continued (step S104). In a case where the touch on the distribution angle adjustment object 21 is not being continued (No at step S104), the process returns to the processing at step S101 and repeatedly executes the same processing.

In a case where the touch on the distribution angle adjustment object 21 is being continued (Yes at step S104), the process returns to the processing at step S102 and repeatedly executes the processing at step S102 and later.

Through the above-described distribution angle adjustment processing according to the first embodiment, the distribution angle of the illumination device 1 in the Dx and Dy directions can be simultaneously adjusted in accordance with the movement amount of the distribution angle adjustment object 21 in the X and Y directions while touch on the distribution angle adjustment object 21 is being continued.

Second Embodiment

Figure 17:
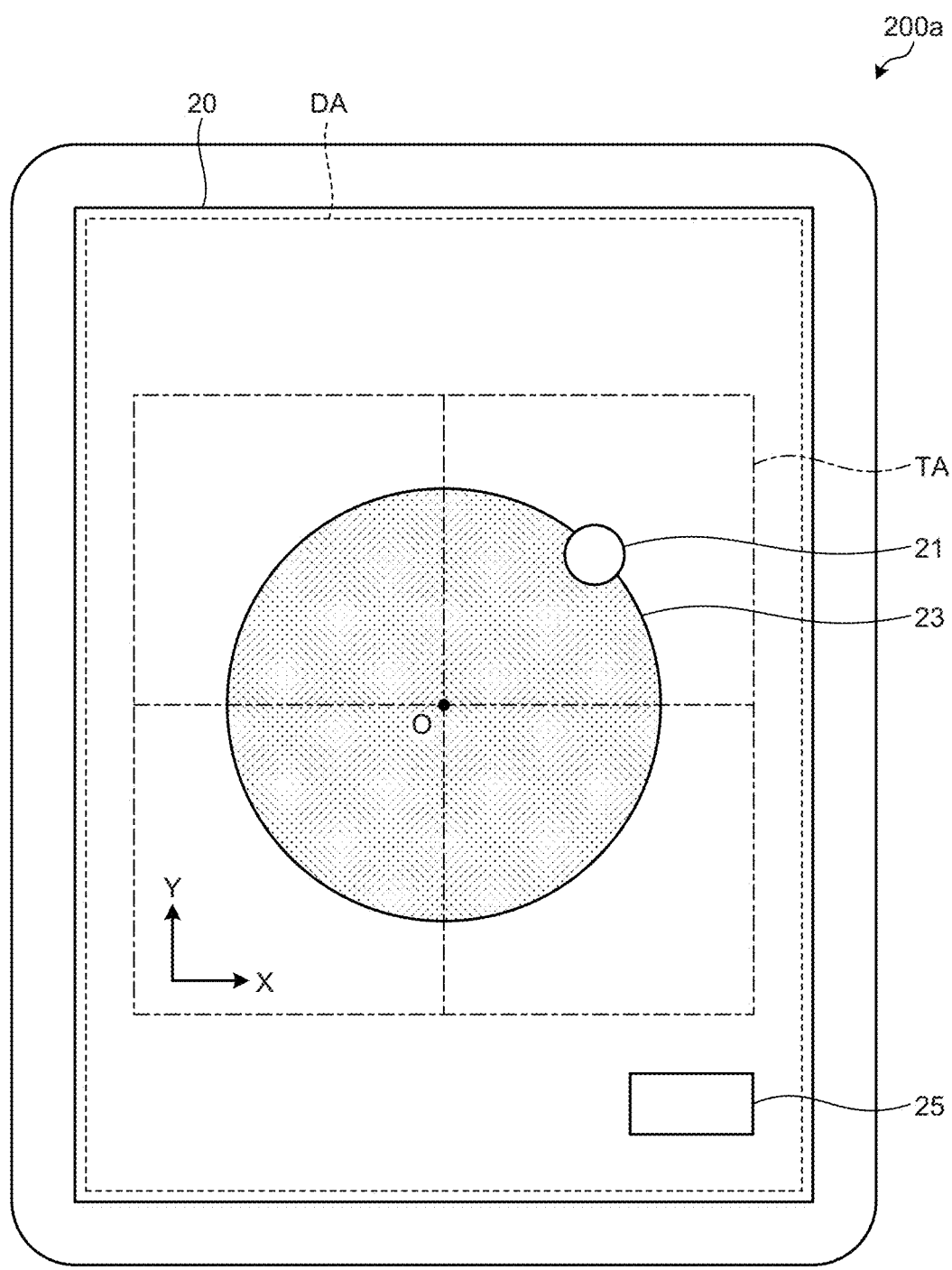
FIG. 17 is a conceptual diagram illustrating a display aspect of a control device according to a second embodiment.

FIG. 17 is a conceptual diagram illustrating a display aspect of a control device according to a second embodiment. As illustrated in FIG. 17, the display region DA of this control device 200a according to the second embodiment is provided with an adjustment cancellation object 25 configured to cancel a result of distribution angle adjustment processing, in a region outside the distribution angle adjustment region TA. The adjustment cancellation object 25 only needs to be provided at a predetermined position in the display region DA of the display panel 20 and the present disclosure is not limited by the position where the adjustment cancellation object 25 is provided.

Note that, in the example illustrated in FIG. 17, the distribution angle adjustment object 21 configured to adjust the distribution angle of the illumination device 1 is provided in a region overlapping the first quadrant of the XY plane on the distribution angle adjustment region TA, but as in the first embodiment, the distribution angle adjustment object 21 may be provided in the second quadrant of the XY plane on the distribution angle adjustment region TA, in the third quadrant of the XY plane on the distribution angle adjustment region TA, in the fourth quadrant of the XY plane on the distribution angle adjustment region TA, or in each quadrant of the XY plane on the distribution angle adjustment region TA.

Figure 18:
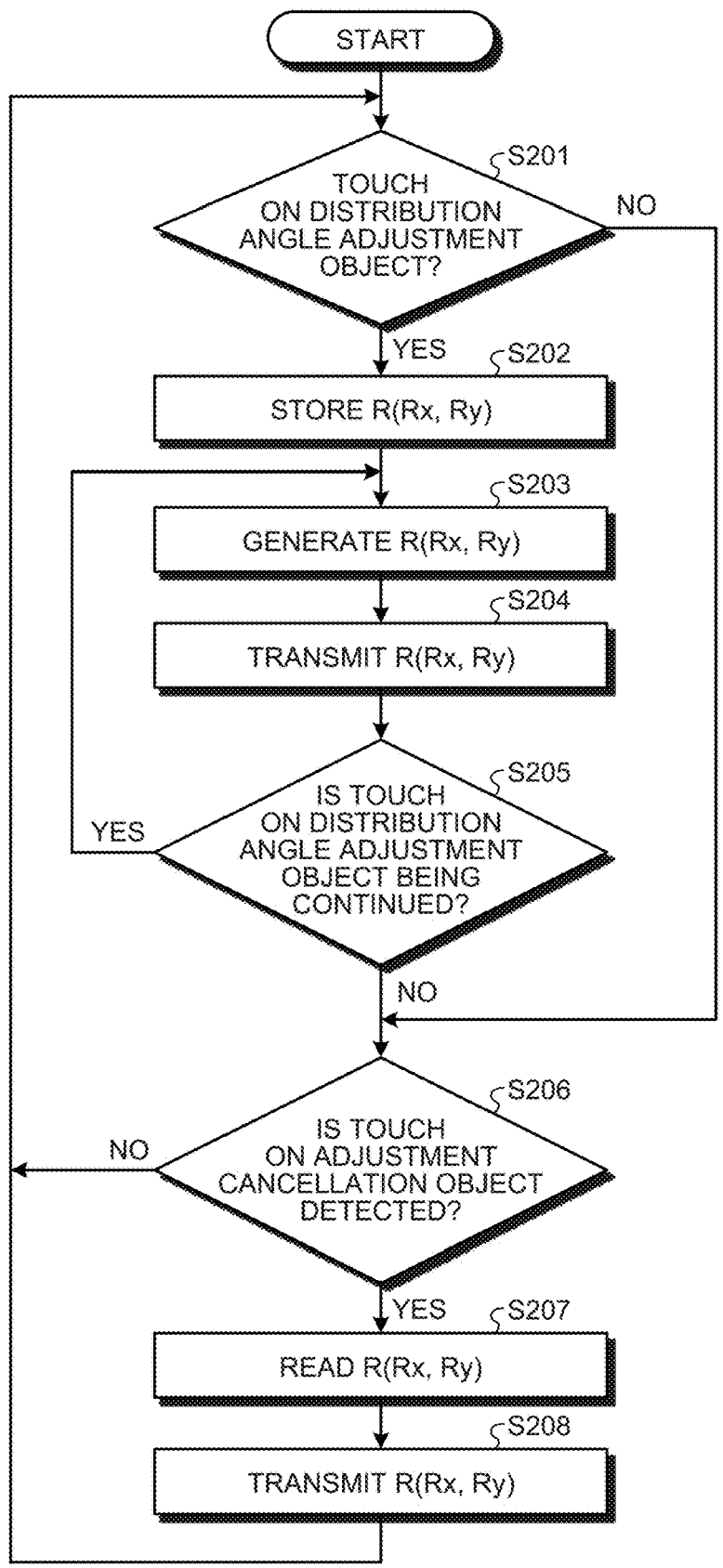
FIG. 18 is a flowchart illustrating an example of distribution angle adjustment processing according to the second embodiment.

FIG. 18 is a flowchart illustrating an example of the distribution angle adjustment processing according to the second embodiment.

The detector 211 detects existence of touch on the distribution angle adjustment object 21 (step S201). In a case where no touch on the distribution angle adjustment object 21 is detected (No at step S201), the process proceeds to step S206 to be described later.

In a case where touch on the distribution angle adjustment object 21 is detected (Yes at step S201), the distribution angle data generator 221 stores the current distribution angle data R(Rx, Ry) of the illumination device 1 in the storage 223 as pre-adjustment data (step S202).

Subsequently, the distribution angle data generator 221 generates the distribution angle data R(Rx, Ry) in accordance with the movement amount of the distribution angle adjustment object 21 extracted by the coordinate extractor 212 (step S203). Specifically, the distribution angle data generator 221 adds the movement amount of the distribution angle adjustment object 21 to the current distribution angle of the illumination device 1.

The control device 200a transmits the distribution angle data R(Rx, Ry) generated by the distribution angle data generator 221 to the illumination device 1 through the communication means 300 (step S204).

The detector 211 detects whether the touch on the distribution angle adjustment object 21 is being continued (step S205). In a case where the touch on the distribution angle adjustment object 21 is being continued (Yes at step S205), the process returns to the processing at step S203 and repeatedly executes the processing at step S203 and later.

In a case where no touch on the distribution angle adjustment object 21 is detected at step S201 (No at step S201) or in a case where the touch on the distribution angle adjustment object 21 is not being continued at step S205 (No at step S205), the detector 211 subsequently detects existence of touch on the adjustment cancellation object 25 (step S206).

In a case where no touch on the adjustment cancellation object 25 is detected (No at step S206), the process returns to the processing at step S201 and repeatedly executes the processing at step S201 and later.

In a case where touch on the adjustment cancellation object 25 is detected (Yes at step S206), the distribution angle data generator 221 reads, from the storage 223, the distribution angle data R(Rx, Ry) stored as the pre-adjustment data in the storage 223 at step S202 (step S207).

The control device 200a transmits the distribution angle data R(Rx, Ry) read from the storage 223 to the illumination device 1 through the communication means 300 (step S208) and the process returns to the processing at step S201.

Through the above-described distribution angle adjustment processing according to the second embodiment, similarly to the distribution angle adjustment processing according to the first embodiment, the distribution angle of the illumination device 1 in the Dx and Dy directions can be simultaneously adjusted in accordance with the movement amount of the distribution angle adjustment object 21 in the X and Y directions while touch on the distribution angle adjustment object 21 is being continued.

Moreover, through the distribution angle adjustment processing according to the second embodiment, the distribution angle of the illumination device 1 in the Dx and Dy directions can be restored to a state before adjustment by transmitting the distribution angle data stored as pre-adjustment data in the storage 223 to the illumination device 1 in a case where touch on the adjustment cancellation object 25 is detected.

Third Embodiment

Figure 19:
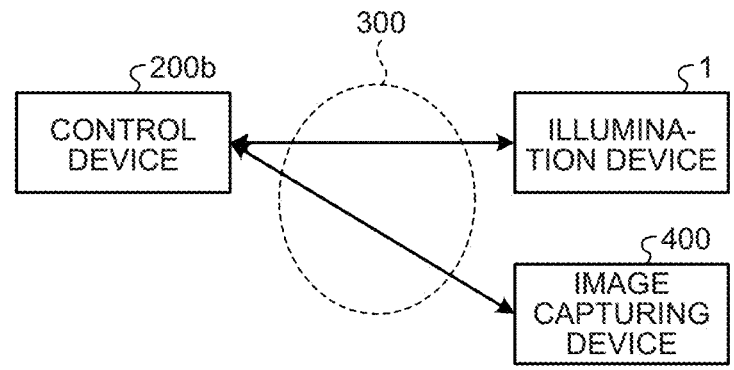
FIG. 19 is a schematic view illustrating an example of the configuration of an illumination system according to a third embodiment.

FIG. 19 is a schematic view illustrating an example of the configuration of an illumination system according to a third embodiment. The illumination system according to the third embodiment includes the illumination device 1, a control device 200b, and an image capturing device 400.

Various signals for the image capturing device 400 are transmitted and received between the image capturing device 400 and the control device 200b through the communication means 300.

Figure 20:
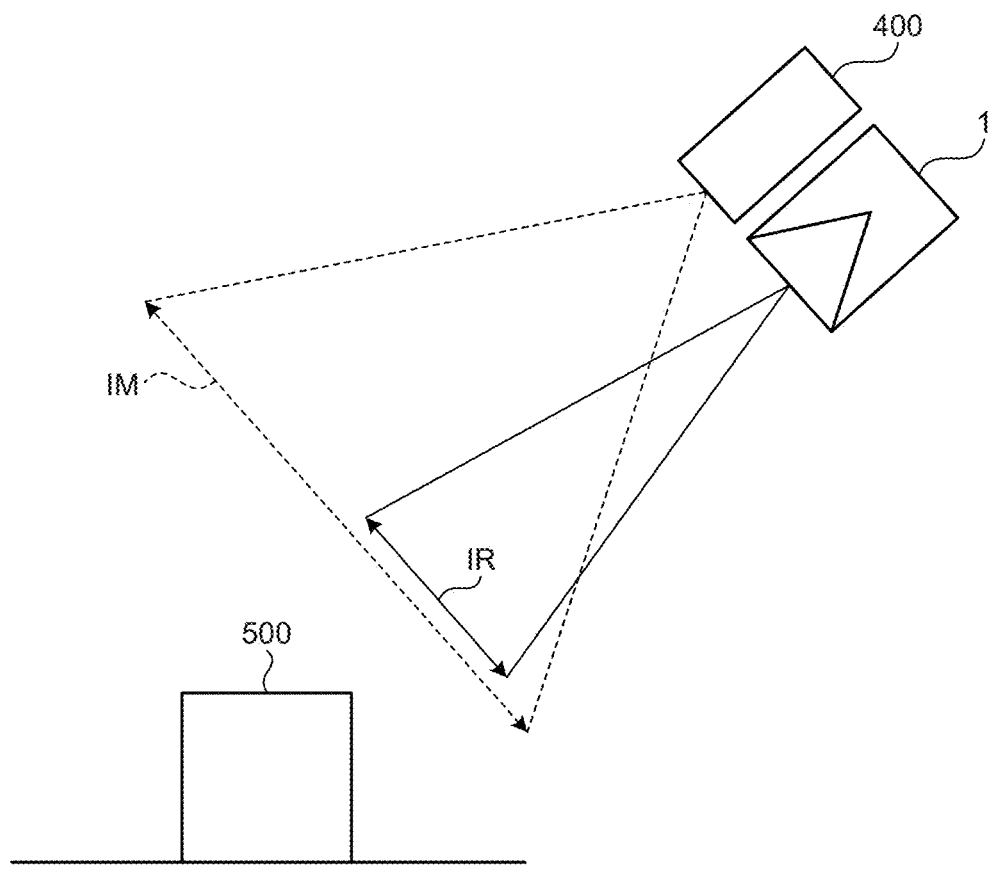
FIG. 20 is a conceptual diagram illustrating the relation between an irradiation area of light from the illumination device and an image capturing area of an image capturing device.

FIG. 20 is a conceptual diagram illustrating the relation between the irradiation area of light from the illumination device and the image capturing area of the image capturing device. FIG. 20 illustrates an example in which an irradiation target object 500 is irradiated with light from the illumination device 1.

As illustrated in FIG. 20, an image capturing area IM of the image capturing device 400, which is illustrated with dashed lines, includes an irradiation area IR of light from the illumination device 1, which is illustrated with solid lines.

Figure 21:
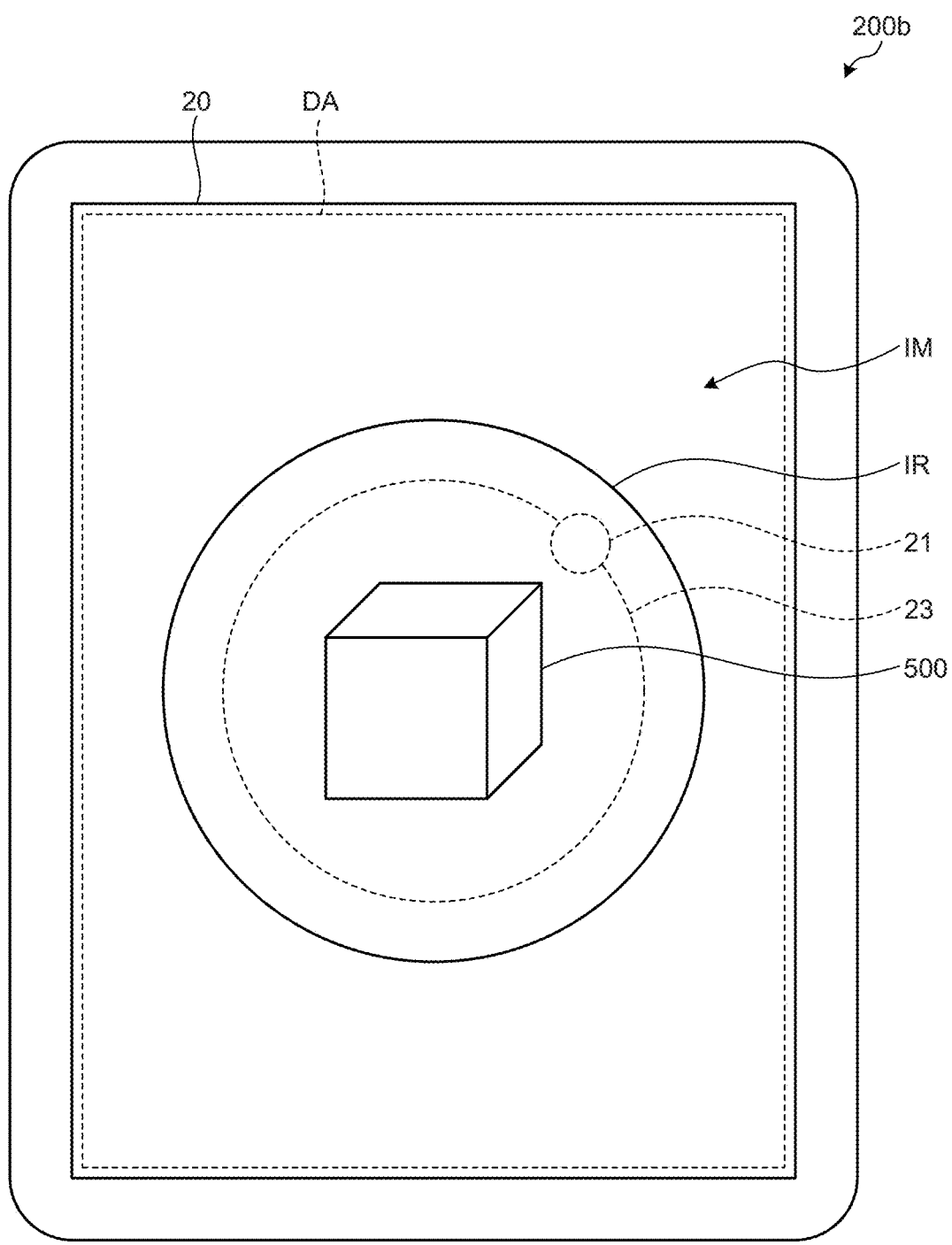
FIG. 21 is a conceptual diagram illustrating a display aspect of a control device according to the third embodiment.

FIG. 21 is a conceptual diagram illustrating a display aspect of the control device according to the third embodiment. When the distribution angle of the illumination device 1 is to be adjusted, an image of the inside of the image capturing area IM of the image capturing device 400 is displayed in the display region DA of the control device 200b according to the third embodiment as illustrated in FIG. 21. Accordingly, the irradiation area IR of light with which the irradiation target object 500 is irradiated can be visually recognized on the display panel of the control device 200b, and thus the progress of adjustment of the distribution angle of the illumination device 1 can be more effectively monitored.

Note that, in the example illustrated in FIG. 21, the distribution angle adjustment object 21 configured to adjust the distribution angle of the illumination device 1 is provided in a region overlapping the first quadrant of the XY plane on the distribution angle adjustment region TA, but as in the first and second embodiments, the distribution angle adjustment object 21 may be provided in the second quadrant of the XY plane on the distribution angle adjustment region TA, in the third quadrant of the XY plane on the distribution angle adjustment region TA, in the fourth quadrant of the XY plane on the distribution angle adjustment region TA, or in each quadrant of the XY plane on the distribution angle adjustment region TA.

Figure 22:
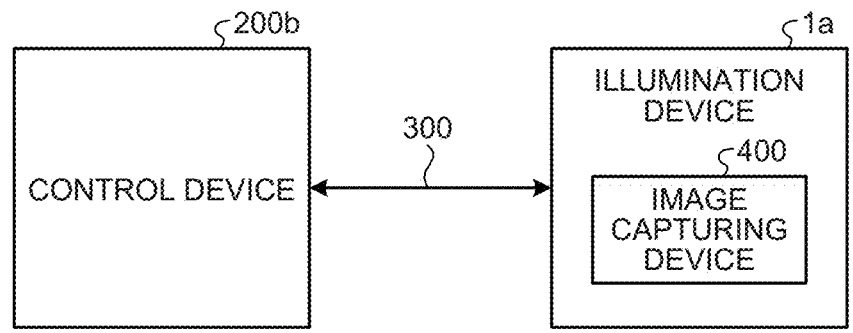
FIG. 22 is a schematic view illustrating a modification of the configuration of the illumination system according to the third embodiment.
Figure 23:
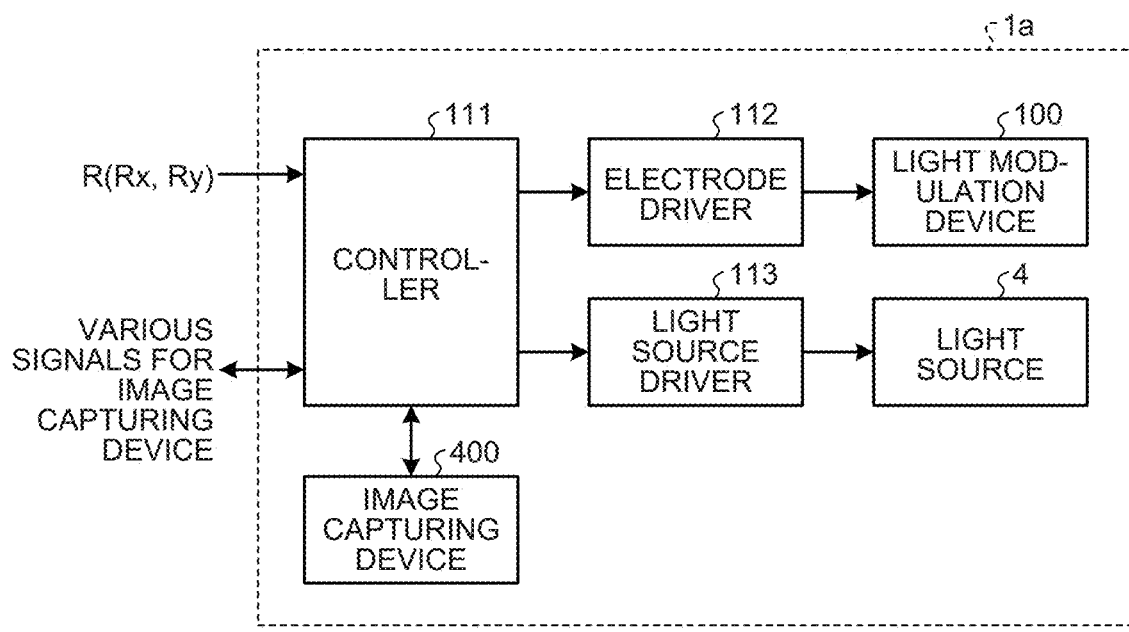
FIG. 23 is a diagram illustrating a modification of the control block configuration of the illumination device.

FIG. 22 is a schematic view illustrating a modification of the configuration of the illumination system according to the third embodiment. FIG. 23 is a diagram illustrating a modification of the control block configuration of the illumination device.

As illustrated in FIG. 22, the image capturing device 400 may be provided in an illumination device 1a. In this case, as illustrated in FIG. 23, the image capturing device 400 may transmit and receive various signals for the image capturing device, including image signals, through the controller 111 of the illumination device 1a.

The preferable embodiments of the present disclosure are described above, but the present disclosure is not limited to such embodiments. Contents disclosed in the embodiments are merely exemplary, and various kinds of modifications are possible without departing from the scope of the present disclosure. Any modification performed as appropriate without departing from the scope of the present disclosure belongs to the technical scope of the present disclosure.

What is claimed is:

1. A control device of an illumination system including an illumination device capable of controlling a distribution angle of light emitted from a light source, the control device comprising:
    a detection device including a distribution angle adjustment region for the illumination device on an XY plane with a predetermined position as the origin in a detection region provided with a plurality of detection elements arranged in an X direction and a Y direction;
    a display panel including a display region overlapping the detection region in plan view, the display panel being provided with a distribution angle adjustment object in a region overlapping the distribution angle adjustment region in the display region; and
    a processing device configured to generate distribution angle data for controlling a distribution angle of the illumination device in accordance with a movement amount of the distribution angle adjustment object in the X and Y directions on the XY plane.

2. The control device of an illumination system according to claim 1, wherein the distribution angle adjustment object is provided in the first quadrant of the XY plane.

3. The control device of an illumination system according to claim 1, wherein the distribution angle adjustment object is provided in the second quadrant of the XY plane.

4. The control device of an illumination system according to claim 1, wherein the distribution angle adjustment object is provided in the third quadrant of the XY plane.

5. The control device of an illumination system according to claim 1, wherein the distribution angle adjustment object is provided in the fourth quadrant of the XY plane.

6. The control device of an illumination system according to claim 1, wherein the display panel displays a schematically shaped image of a light irradiation area of the illumination device in a region overlapping the distribution angle adjustment region in the display region.

7. The control device of an illumination system according to claim 6, wherein the distribution angle adjustment object is provided on an outline of the schematically shaped image.

8. The control device of an illumination system according to claim 1, wherein the display panel is provided with an adjustment cancellation object at a predetermined position in the display region, the adjustment cancellation object being configured to cancel a result of distribution angle adjustment by the processing device.

9. The control device of an illumination system according to claim 1, wherein
    the illumination system includes an image capturing device configured to capture an image including a light irradiation area of the illumination device, and
    the display panel displays the image in the display region when adjusting the distribution angle of the illumination device.

10. The control device of an illumination system according to claim 1, wherein
    the illumination device includes an image capturing device configured to capture an image including a light irradiation area of the illumination device, and
    the display panel displays the image in the display region when adjusting the distribution angle of the illumination device.

* * * * *